(12) United States Patent
Silver

(10) Patent No.: US 11,460,494 B2
(45) Date of Patent: *Oct. 4, 2022

(54) SPECTRAL ANALYSIS OF ELECTRONIC CIRCUITS

(71) Applicant: Resonant, Inc., Goleta, CA (US)

(72) Inventor: Richard N. Silver, Santa Barbara, CA (US)

(73) Assignee: RESONANT, INC., Goleta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/107,767

(22) Filed: Nov. 30, 2020

(65) Prior Publication Data

US 2021/0080493 A1    Mar. 18, 2021

Related U.S. Application Data

(63) Continuation of application No. 16/442,290, filed on Jun. 14, 2019, now Pat. No. 10,852,331, which is a (Continued)

(51) Int. Cl.
*G01R 23/167* (2006.01)
*G06F 30/36* (2020.01)
(Continued)

(52) U.S. Cl.
CPC .......... *G01R 23/167* (2013.01); *G06F 30/36* (2020.01); *G06F 2119/18* (2020.01);
(Continued)

(58) Field of Classification Search
CPC .... G06F 30/36; G06F 17/5063; G01R 23/167
See application file for complete search history.

(56) References Cited

U.S. PATENT DOCUMENTS 6,397,171 B1    5/2002  Belk
7,487,078 B1    2/2009  Phillips et al.
(Continued)

OTHER PUBLICATIONS

Final Office Action for U.S. Appl. No. 15/390,254 dated Aug. 16, 2017 (8 pages).
(Continued)

*Primary Examiner* — Bryan Bui
(74) *Attorney, Agent, or Firm* — Foley & Lardner LLP

(57) ABSTRACT

A method of designing a filter to meet a set of specifications. The set of specifications is received, and a filter design is established. Analysis of the filter design is performed by: determining a part admittance matrix; determining a circuit admittance matrix based on the part admittance matrices; reducing interior nodes of the circuit admittance matrix; reducing algebraic nodes to transform the circuit admittance matrix into a Green's Function; evaluating the Green's Function to determine a circuit exterior node admittance matrix; and transforming the circuit exterior node admittance matrix to a circuit scattering matrix. The circuit scattering matrix is compared to the set of specifications to determine whether the filter design is satisfactory. When a determination is made that the design is not satisfactory, the filter design is modified and the process is repeated. When a determination is made that the design is satisfactory, a filter design description is output.

20 Claims, 19 Drawing Sheets

Related U.S. Application Data continuation-in-part of application No. 15/390,254, filed on Dec. 23, 2016, now abandoned.

(60) Provisional application No. 62/339,445, filed on May 20, 2016.

(51) Int. Cl.
*H03H 9/46* (2006.01)
*H03H 9/54* (2006.01)
*H03H 9/64* (2006.01)
*G06F 119/18* (2020.01)

(52) U.S. Cl.
CPC .............. *H03H 9/462* (2013.01); *H03H 9/54* (2013.01); *H03H 9/64* (2013.01)

(56) References Cited

U.S. PATENT DOCUMENTS

| | | | |
|---|---|---|---|
| 9,165,101 | B2 | 10/2015 | Turner et al. |
| 10,140,406 | B2 | 11/2018 | Turner et al. |
| 10,852,331 | B2 * | 12/2020 | Silver .................. G01R 23/167 |
| 2015/0220665 | A1 | 8/2015 | Turner et al. |
| 2016/0070827 | A1 * | 3/2016 | Turner .................. H03H 9/465 716/104 |
| 2017/0083640 | A1 * | 3/2017 | Turner .................. G06F 30/327 |
| 2017/0170536 | A1 * | 6/2017 | Tkadlec .................... H01P 1/30 |
| 2017/0364611 | A1 * | 12/2017 | Turner .................. H03H 9/542 |
| 2018/0189426 | A1 * | 7/2018 | Turner .................... H03H 3/00 |

OTHER PUBLICATIONS

Non-Final Office Action for US Appln. U.S. Appl. No. 15/390,254 dated Mar. 20, 2017 (6 pages).

Non-Final Office Action for U.S. Appl. No. 16/442,290 dated Mar. 16, 2020 (6 pages).

Notice of Allowance for U.S. Appl. No. 16/442,290 dated Jul. 31, 2020 (9 pages).

* cited by examiner

SPECTRAL ANALYSIS OF ELECTRONIC CIRCUITS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims the benefit of and priority as a continuation to U.S. patent application Ser. No. 16/442,290 filed on Jun. 14, 2019; which is a continuation-in-part of U.S. patent application Ser. No. 15/390,254 filed on Dec. 23, 2016; which claims priority from provisional application No. 62/339,445 filed on May 20, 2016, entitled "SPECTRAL ANALYSIS OF ELECTRONIC CIRCUITS"; each of which is hereby incorporated by reference in its entirety.

BACKGROUND

Field

This disclosure relates to spectral analysis of electronic circuits.

Description of the Related Art

Conventional electronic circuit spectral analysis calculates an exterior node admittance spectrum one frequency at a time. The circuit admittance is the sum of admittances of component parts connected to interior and exterior nodes. Interior node elimination (or Kron reduction) yields the exterior node admittance, from which the circuit behavior may be predicted. This process is repeated by a loop over frequency points to create an admittance spectrum.

Due to the large number of frequency points typically analyzed, and the fact that in implementations of analysis discussed above, central processing unit ("CPU") time scales linearly in the number of frequency points. This may require extensive amounts of time and expense (as well as processor resources) when designing and manufacturing microwave filter circuits.

DETAILED DESCRIPTION

Figure 1:
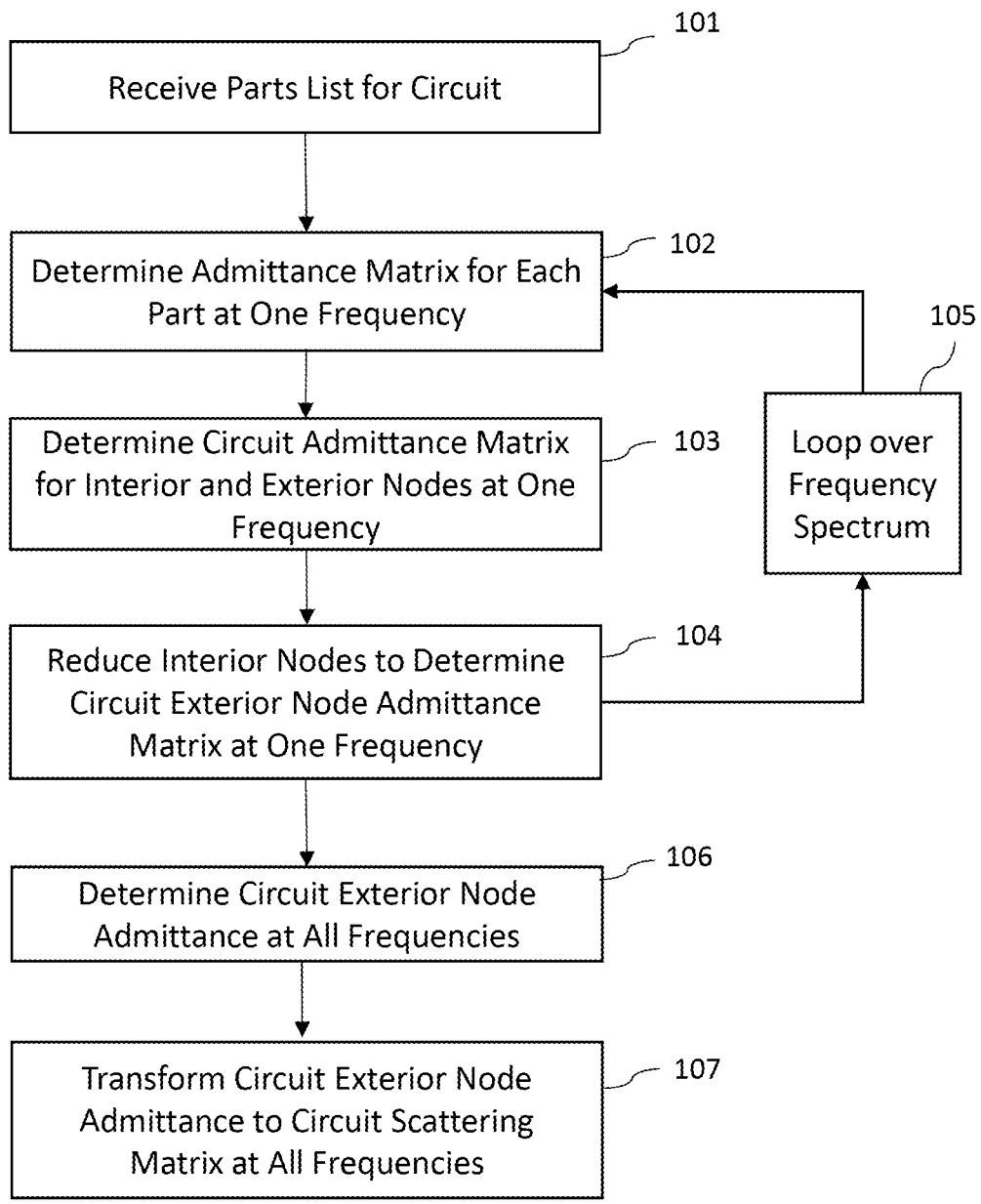
FIG. 1 shows a flow chart of calculation of spectra in conventional circuit analysis using Kron reduction.

As discussed above, design and manufacture of microwave filters using iterative frequency-by-frequency analysis via calculation of an exterior node admittance spectrum may require extensive processor resources and time, slowing and adding expense to the manufacturing process. Instead, the systems and methods discussed herein are directed to an improved, faster and more efficient process for spectral analysis and manufacture of electronic circuits and equivalent linear time invariant systems with particular emphasis on spectral analysis and design of microwave filters using acoustic resonators. Specifically, some or all of the frequency dependent features are removed from earlier parts of the analysis and shifted to later calculations, reducing or eliminating the iterative frequency-by-frequency process at earlier or intermediate steps. This may result in a very significant savings in processing load on the CPU. In the limit case of very large number of frequency points, the CPU time dependence is linear but with a much smaller coefficient than in implementations not utilizing the systems and methods described herein.

While specific examples discussed subsequently include surface acoustic wave (SAW) resonators, the spectral analysis method is applicable to filters using other forms of acoustic or mechanical resonators including bulk acoustic wave (BAR) resonators, film bulk acoustic wave (FBAR) resonators, thin-film bulk acoustic wave (TBAR) resonators, and microelectromechanical system (MEMS) resonators. Symbolic algebra can be used to transform equations into a form that is more efficient for computation or that provides greater insight. An algebraic node transformation of the admittance can improve the scaling of CPU time with the number of frequency points. The nodal analysis of the admittance is transformed by a process of algebraic node expansion and interior node reduction. The transformed form for the exterior node admittance is analogous to a Green's, or impulse response, function. This simplifies the frequency dependence of the admittance, which enables orders of magnitude faster computation of spectral properties such as the scattering matrix and pole zero analysis.

The algebraic node transformation method is applicable to lumped component circuits assembled from resistors, inductors and capacitors. It is also applicable to many other linear time invariant systems which have equivalent circuit analogues. It may be adapted to distributed electronic components such as calculated by electromagnetic simulation.

The design and characterization of circuits such as filters, duplexers, and multiplexers can involve processes of synthesis, optimization and survey over extremely large numbers of possible circuit designs. Spectral analysis over thousands of frequency points and pole zero analysis can be rate limiting steps for this design process. The methods described herein accelerate the circuit design process by orders of magnitude, which can enable discovery of new types of circuits.

The method introduces algebraic node analysis, and matrix transformations comprised, in part, of successive nodal expansions and interior node reductions, to isolate the frequency dependence from the remaining computation of the spectral response of a circuit. The transformation from interior to algebraic node representations of the admittance enables most of the calculation to be done one time only for all frequencies, thereby accelerating calculation for many frequency points.

According to this method, a frequency dependent external node admittance matrix is transformed into the Green's function form. The Fourier transform propagates as the exponential of time multiplied by a complex symmetric stable Hurwitz matrix. Frequency independent matrices required to form the Green's function are calculated before a final vectorized calculation of the frequency spectrum. Efficient linear algebra methods developed for Green's function evaluation in many disciplines, such as physics and chemistry, may be adapted to the spectral analysis of circuits. The central processing unit ("CPU") time scales sublinearly in the number of frequency points when the method described herein is employed. It approaches linear scaling at large number of frequency points, but with a much smaller coefficient than the conventional method. Detailed comparisons depend on the particular circuit and the method for Green's function evaluation.

For many applications, the method is orders of magnitude faster than the conventional spectral analysis method, especially if large numbers of frequency points are desired. Examples drawn from surface acoustic wave device design demonstrate approximately two orders of magnitude speed increase for spectral analysis and pole zero analysis.

The algebraic node transformation method also provides a new characterization of the dynamical behavior of circuits that is complementary to other established methods. Features of analyticity, causality, positivity and sum rules may transcend particular applications. They can be used as powerful constraints on circuit data analysis and modeling.

FIG. 1 shows a flow diagram for a conventional circuit spectral analysis method.

At step 101, a filter design (or parts list) for a circuit is received. The admittance matrix of a circuit is assembled from the admittance matrices of its parts (or components) by connecting parts together at nodes. The filter design may be represented as an electronic circuit composed of interconnected circuit components consisting of resistive and reactive (i.e. capacitor and inductor) circuit components. The filter design can be based on a set of specifications, which may include, for example, specifications on the lower and upper frequencies of a pass band, one or more stop bands, a maximum insertion loss over the pass band, a minimum insertion loss over each stop band, a minimum return loss, and/or other requirements. The filter design can also be based on a selected architecture, including a substrate configuration, a piezoelectric material and crystalline orientation, the number, type, and arrangement of components, and other manufacturing-related characteristics.

At step 102, an admittance matrix is determined for each part at one frequency using a library of frequency-dependent functions. This method includes a library of functions to calculate an admittance matrix for each type of part. Simple parts such as resistors, inductors and capacitors have only exterior nodes. Parts that are subcircuits have interior nodes as well.

At step 103, a circuit admittance matrix can be determined at one frequency by attaching exterior nodes of parts to circuit nodes.

At step 104, the circuit interior nodes are then eliminated (or Kron reduced) to determine a circuit exterior node admittance matrix at one frequency, where the submatrices are functions of frequency.

At step 105, the calculations of step 102, step 103, and step 104 are looped over a number of frequencies spanning an indicated frequency spectrum, such that a circuit exterior node admittance is determined at all frequencies of interest at step 106.

At step 107, the circuit exterior node admittance is transformed into a circuit scattering matrix at all frequencies of interest. As discussed above, the CPU time for the conventional algorithm scales linearly in the number of frequency points.

In the algebraic node transformation method shown in FIG. 2 and described further herein, the introduction of frequency dependence is pushed to a later step. For a modest number of frequency points this removes most of the dependence of the CPU time on the number of frequency points. This is a very significant saving in processing load on the CPU. In the limit case of very large number of frequency points, the CPU time dependence is linear but with a much smaller coefficient than the conventional method.

At step 201, a filter design (or parts list) for a circuit is received.

At step 202, admittance matrices with algebraic nodes are determined for each part (or component) in the filter design (or parts list) using a library of frequency-independent functions. Here, an expanded admittance matrix is calculated for each type of part, which includes exterior and interior circuit nodes, as well as algebraic nodes. The diagonal elements of the admittance matrix for algebraic nodes have a linear frequency dependence. All other admittance matrix elements are frequency independent.

At step 203, the expanded circuit admittance with exterior, interior and algebraic nodes is assembled by connecting exterior nodes of parts to exterior and interior circuit nodes. The expanded admittance for the complete circuit retains all the algebraic nodes of the simple parts and the subcircuits that comprise the whole. The only frequency dependence is linear in the diagonal elements of the expanded admittance matrix for algebraic nodes. All other elements of the expanded circuit admittance matrix are frequency independent.

At step 204, the expanded circuit admittance is transformed into a reduced circuit admittance matrix for only exterior and algebraic nodes. The interior circuit nodes are eliminated by Kron reduction. The reduced matrix is the sum of a frequency-dependent diagonal matrix and a frequency-independent complex symmetric matrix. The algebraic node submatrix of the frequency independent matrix satisfies the stability properties of a Hurwitz matrix. Eigenvalues are either positive real or complex conjugate pairs with positive real parts. They describe the internal dynamics of the system. External coupling is provided by the matrix elements between algebraic and exterior nodes.

At step 205, this admittance is further transformed by reduction of the algebraic nodes. The resulting circuit admittance matrix for exterior circuit nodes has a Green's Function form with a spectral dependence on the Hurwitz matrix. This form is similar mathematically to impulse or linear response functions in other disciplines.

At step 206, the Green's Function is evaluated to determine a circuit exterior node admittance at all frequencies of interest. The submatrices in this expression are independent of frequency, so they only need to be calculated once. For modest numbers of frequency points, the CPU time required to evaluate the submatrices for all frequency points in the fast circuit spectral analysis method is comparable to the time required for evaluation of submatrices for a single frequency point in the conventional method. A variety of existing numerical methods developed in other disciplines may be adapted to evaluate Green's functions.

At step 207, the circuit exterior node admittance is transformed into a circuit scattering matrix at all frequencies of interest.

Algebraic Node Expansion

In nodal analysis, a circuit is represented by a set of nodes with electrical components connected between them. Each circuit node is associated with a current I and voltage V. A set of nodes is associated with vectors of currents I and voltages V. By definition, the admittance matrix Y is the relation between currents and voltages, I=YV. The circuit obeys Kirchoff Current Law. Currents for 'interior' nodes are zero. Currents for 'exterior' nodes may be non-zero.

Algebraic nodes may be introduced by considering the following problem. Assume there are fundamental units of resistance $R_0$ and capacitance $C_0$. And assume there are elemental shunt components with these values shown in FIG. 3. The problem to be solved is to describe a way of assembling all RLC circuits by connecting the unit components using only J inverters.

The admittances for unit components are as follows.

Figure 3A:
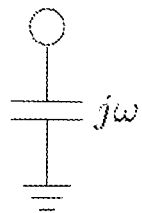
FIG. 3A shows a schematic diagram of a unit shunt capacitor

For a unit shunt capacitor shown in FIG. 3A, $$Y_1^C = j\omega C_u.$$

Figure 3B:
FIG. 3B shows a schematic diagram of a unit shunt resistor.

For a unit shunt resistor shown in FIG. 3B, $$Y_1^R = \frac{1}{R_u}.$$

Figure 3C:
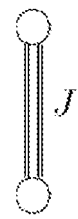
FIG. 3C shows a schematic diagram of a J inverter.

For a unit J inverter in FIG. 3C, $$Y_2^J = \frac{j}{R_u}\begin{pmatrix} 0 & J \\ J & 0 \end{pmatrix}.$$

Shunt means the component is connected between an exterior node and ground. J inverters are represented by a double line between two exterior nodes.

The choice of scales is arbitrary. The unit of resistance may be an ohm Ω, or it may be the transmission line standard of 50Ω. The unit of capacitance may be a picofarad. $R_u=1$ and $C_u=1$ in the selected units. Using dimensional analysis, if required, the admittances units can be reintroduced at the end of a calculation.

Figure 3D:
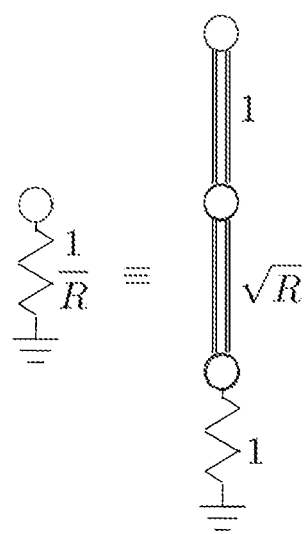
FIG. 3D shows a schematic diagram of an assembly of a shunt resistor using a unit shunt resistor and two J inverters.
Figure 3E:
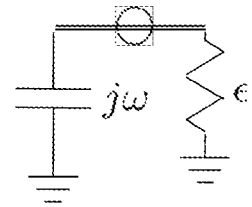
FIG. 3E shows a schematic diagram of an assembly of an infinitesimal shunt conductance and a unit shunt capacitor.

FIG. 3D shows that a shunt resistor for any R may be assembled from these basic components by connecting a unit shunt resistor to two j inverters with J=√R and J=1. A node shared by two or more components, and not with the exterior, is an 'interior' node. The admittance is $$Y_3^R = \begin{pmatrix} 0 & j & 0 \\ j & 0 & j\sqrt{R} \\ 0 & j\sqrt{R} & 1 \end{pmatrix}.$$

There are two interior nodes.

Node elimination, or Kron reduction, is important to all that follows. To clarify, suppose there are two types of nodes, a and b. In block submatrix form $$\begin{pmatrix} I_a \\ I_b \end{pmatrix} = \begin{pmatrix} Y_{aa} & Y_{ab} \\ Y_{ba} & Y_{bb} \end{pmatrix} \times \begin{pmatrix} V_a \\ V_b \end{pmatrix}.$$

To eliminate all the b nodes, invoke Kirchoff's Current Law to solve for $I_b=0$. The result is $$Y_{aa}^r = Y_{aa} - Y_{ab}Y_{bb}^{-1}Y_{ba}.$$

Here, the superscript r denotes reduced.

For the shunt resistor example, the first node is exterior and the second two are interior. Elimination of the third node yields $$Y_2^R = \begin{pmatrix} 0 & j \\ j & R \end{pmatrix}.$$

There is an impedance R on the second node. Reduce that to yield the familiar one node admittance, $Y_1^R=1/R$.

The two and three node admittances are obtained from the one node admittance by 'expansion'. The reverse process is 'reduction'. All three forms produce the same electrical behavior, so they are 'equivalent circuits'.

The unit shunt capacitor is the only frequency ω dependent elemental component. Use of it requires complex variable analysis. An equivalent circuit is needed to control mathematical singularities in the complex ω plane, especially how to close contour integrals. The solution shown in FIG. 3E puts each unit shunt capacitor in parallel with an infinitesimal shunt conductance ε or inverse resistance. The combined admittance is $Y_1 = j\omega + \varepsilon$.

The infinitesimal defines a limit, as in $$\lim_{\varepsilon \to 0} \frac{1}{x \pm j\varepsilon} = P\frac{1}{x} \mp j\pi\delta(x).$$

Here, $\delta(x)$ is a Dirac delta function, an infinitely sharp positive function with an integral equal to one. P indicates the Cauchy principal value in integrals. It relates real and imaginary parts of quantities to be calculated. It assures the Fourier transforms are causal, which means admittances for passive circuits decay with increasing time. Lossless components need this limiting procedure. For lossy components, resistors may replace ε to define complex ω plane contour integrals.

In the following, a unit shunt capacitor is implicitly in parallel with an infinitesimal conductance ε. Equivalently, ω implicitly has an infinitesimal imaginary part $-j\varepsilon$. It is made explicit only where needed for emphasis.

Figure 3F:
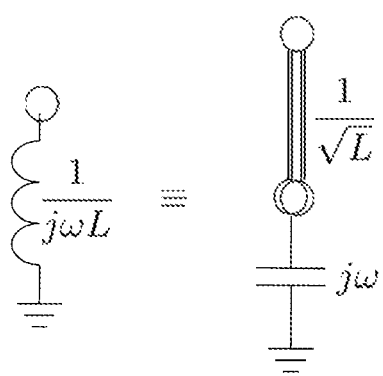
FIG. 3F shows a schematic diagram of an assembly of a shunt inductor from a J inverter and a unit shunt capacitor.

An equivalent circuit for a shunt inductor can be assembled from these components as shown FIG. 3F, by connecting the exterior node of a shunt unit capacitor and the inverter with $J=1/\sqrt{L}$. The two node expanded admittance of an inductor is $$Y_2^L = j\begin{pmatrix} 0 & \frac{1}{\sqrt{L}} \\ \frac{1}{\sqrt{L}} & \omega \end{pmatrix}.$$

Elimination, or Kron reduction, of the algebraic node results in the usual one exterior node admittance for an inductor, $Y_1^L = 1j\omega L$. That proves the expanded two node circuit expanded is an equivalent circuit for an inductor.

The two node admittance puts the frequency ω and the inductor L variables on separate matrix elements. As shall be demonstrated, this separation enables linear algebra transformations that are advantageous for calculating frequency sweeps, or the spectral response, of a circuit. For that reason, the new interior node of the shunt capacitor is labeled an 'algebraic' node.

Figure 3G:
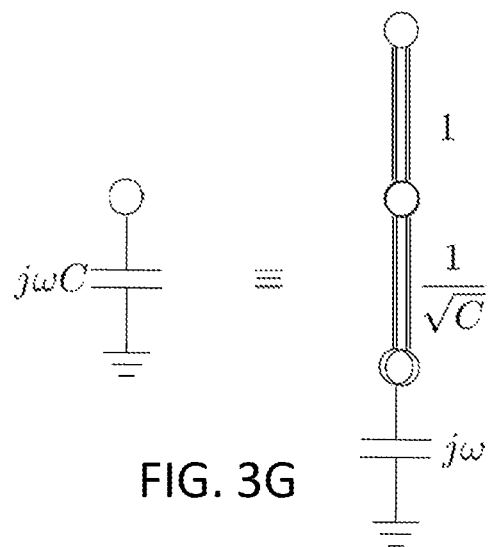
FIG. 3G shows a schematic diagram of an assembly of a shunt capacitor from two J inverters and a unit shunt capacitor.

An equivalent circuit for a shunt capacitor can be assembled as shown in FIG. 3G, by connecting two J inverters with a unit capacitor. One J inverter has J=1 and the other has $J=1/\sqrt{C}$. The three node expanded admittance of a capacitor is $$Y_3^C = j\begin{pmatrix} 0 & 1 & 0 \\ 1 & 0 & \frac{1}{\sqrt{C}} \\ 0 & \frac{1}{\sqrt{C}} & \omega \end{pmatrix}.$$

The first node is an exterior node, the second node is interior, and the third node is algebraic. Elimination of the algebraic and interior nodes yields the familiar one exterior node admittance $Y_1^C = j\omega C$. The two J inverters have enabled a scale transformation of the unit capacitor.

Figure 3H:
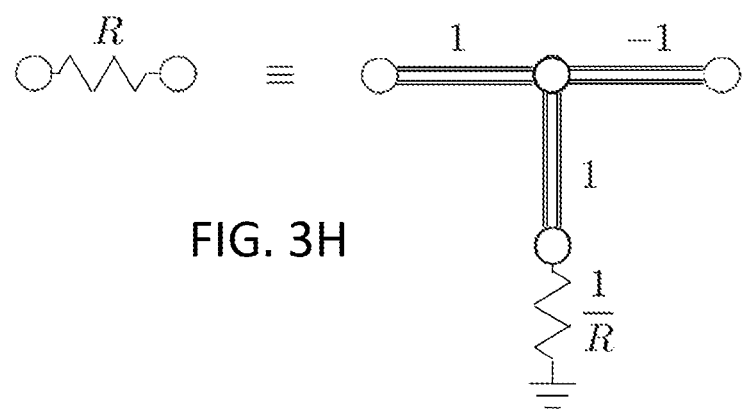
FIG. 3H shows a schematic diagram of an assembly of a series resistor using three unit J inverters and a shunt resistor.

An equivalent circuit for a series component can be assembled as shown in FIG. 3H, by connecting the corresponding shunt component to a T network of three unit J inverters. The four node expanded admittance of a series resistor is $$Y_4^R = \begin{pmatrix} 0 & 0 & j & 0 \\ 0 & 0 & -j & 0 \\ j & -j & 0 & j \\ 0 & 0 & j & \frac{1}{R} \end{pmatrix}.$$

The first two nodes are exterior, and the second two are interior. Elimination of the interior nodes results in the standard two exterior node admittance for a series resistor, $$Y_2^R = \begin{pmatrix} \frac{1}{R} & -\frac{1}{R} \\ -\frac{1}{R} & \frac{1}{R} \end{pmatrix}.$$

For the applications considered in this disclosure, the interior nodes may be eliminated. However, there can be zeros on the diagonal elements for the interior nodes, which may result in division by zero during node elimination. This problem may be regularized by adding an infinitesimal shunt resistance or conductance at the node to be eliminated.

For example, elimination of the interior node for the shunt capacitor $Y_3^C$ yields $$Y_2^C = j\omega\begin{pmatrix} 0 & 0 \\ 0 & 1 \end{pmatrix} + \frac{1}{\varepsilon}\begin{pmatrix} 1 & \frac{1}{\sqrt{C}} \\ \frac{1}{\sqrt{C}} & \frac{1}{C} \end{pmatrix}.$$

This is a two node expanded admittance, with one exterior node and one algebraic node.

Two equivalent ways of representing the one node admittance are $$Y_1^C = \frac{1}{\frac{1}{j\omega C} + \varepsilon}; \quad Y_1^C = j\omega C + \varepsilon.$$

The purpose of infinitesimals is to track how to take a limit in complex variable analysis. So the rules for infinitesimal math differ from normal math, in the same sense that rules for infinity math differ. That is, ε multiplied by something is ε times the sign of something, $\varepsilon + \varepsilon = \varepsilon$, $\varepsilon \times \varepsilon = \varepsilon$, and so on. In the first equation, ω is implicitly $\omega - j\varepsilon$. The two equations are equivalent in the sense of infinitesimal math.

The fully expanded admittance for a series inductor has five nodes, two exterior, two interior and one algebraic. To regularize, add an infinitesimal shunt conductance at the shunt inductor node, and eliminate interior nodes. The reduced admittance has two exterior nodes and one algebraic node, $$Y_3^L = \begin{pmatrix} \varepsilon & -\varepsilon & -\dfrac{j}{\sqrt{L}} \\ -\varepsilon & \varepsilon & \dfrac{j}{\sqrt{L}} \\ -\dfrac{j}{\sqrt{L}} & \dfrac{j}{\sqrt{L}} & j\omega \end{pmatrix}.$$

The ε elements are negligible for numerical purposes and the ε→0 limit may be taken.

The use of tiny resistors and conductances as regularization in complex variable analysis differs from their use to regularize numerical calculations. A computer has limited precision. Regularization by adding tiny resistances or conductances is helpful to dampen effects of random machine errors. The scale for regularization corresponds to the square root of machine precision, approximately $10^{-8}\Omega$ for typical computers. Such numerical regularization is not taken to a zero limit. Too small a regularization can cause numerical calculations to go unstable resulting in, e.g., division by zero errors.

Equivalent circuits for series inductors and capacitors with internal nodes eliminated are illustrated in FIGS. 3I, 3J, 4A, and 4B. These figures use a simplified symbol for the algebraic node as just a circle with an ω on it.

Figure 3I:
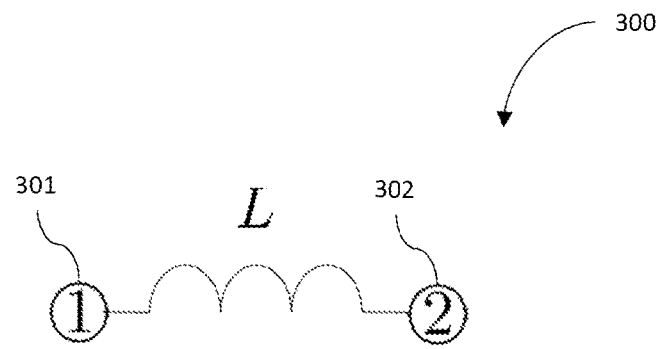
FIG. 3I shows a schematic diagram of standard nodes of a series inductor.
Figure 3J:
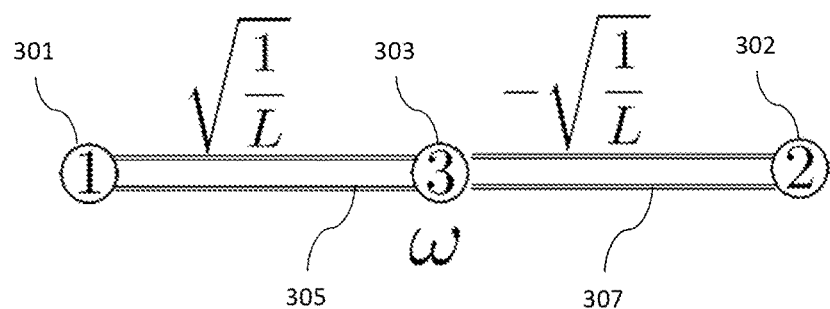
FIG. 3J shows a schematic diagram of expansion to algebraic nodes of the series inductor of FIG. 3I.

FIG. 3I shows a schematic diagram of nodes of a series inductor 300, and FIG. 3J shows a schematic diagram of node expansion of the series inductor of FIG. 3I. Nodes 301 and 302 are exterior nodes. Mathematical expressions give the value of the elements. Node 303 is a frequency dependent algebraic node, which means that the diagonal admittance $Y_{33}=j\omega$. Inverters 305, 307 do not depend on ω. An inverter is a circuit element that flips voltages to currents, and vice versa. Labels on the inverters represent values of the inverters.

Figure 4A:
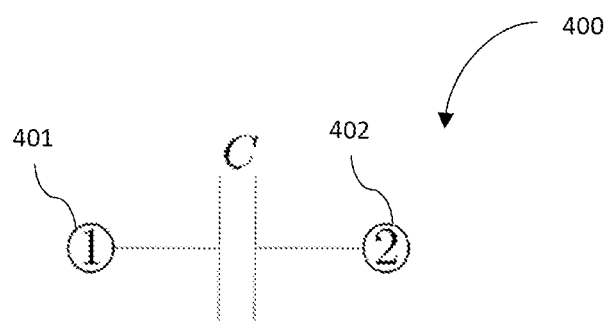
FIG. 4A shows a schematic diagram of standard nodes of a series capacitor.
Figure 4B:
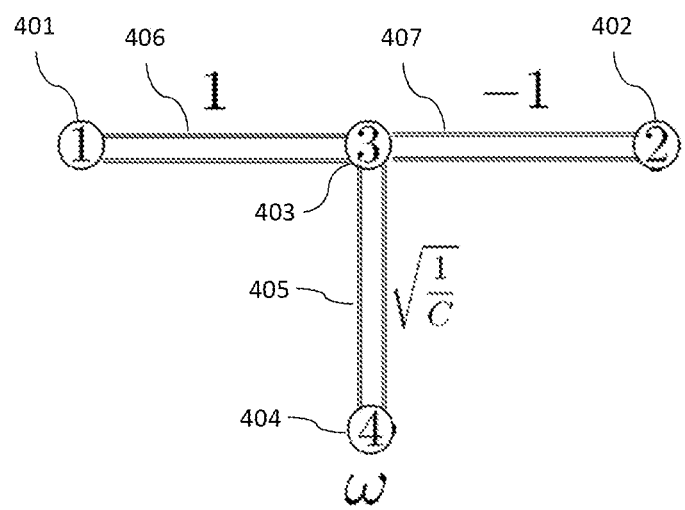
FIG. 4B shows a schematic diagram of node expansion of the series capacitor of FIG. 4A.

FIG. 4A shows a schematic diagram of nodes of a series capacitor 400, and FIG. 4B shows a schematic diagram of node expansion of the series capacitor 400 of FIG. 4A. Nodes 401 and 402 are exterior nodes. Node 404 is a frequency dependent algebraic node, and node 403 is a frequency independent algebraic node, such that $Y_{33}=0$. Labels on J-inverters, 405, 406, and 407 represent values of the inverters.

As shown above, equivalent circuits for any RLC circuit can be assembled from the simple components in FIGS. 3A-3H. As they are connected in a network, exterior nodes become interior, and the algebraic nodes are unchanged. If not useful, interior nodes of any component may be eliminated, resulting in expanded admittances that have only exterior nodes and algebraic nodes.

Reduction of Algebraic Nodes to Green's Function Form

After reduction of all interior nodes, all RLC circuits have an admittance expanded with algebraic nodes in the block matrix form $$Y = j\omega \begin{pmatrix} 0 & 0 \\ 0 & 1 \end{pmatrix} + \begin{pmatrix} Y_{ee} & Y_{ea} \\ Y_{ae} & Y_{aa} \end{pmatrix}.$$

A subscript 'e' denotes an exterior node, and a subscript 'a' denotes an algebraic node. Here 1 denotes a unit diagonal matrix in the space of algebraic nodes. All of the ω dependence is made explicit by the expansion to algebraic nodes. The number of such nodes equals the sum of capacitors and inductors in the circuit.

Expansion of the admittance to algebraic nodes is a great simplification of the frequency dependence of RLC circuits. All of the block matrices need to be calculated only once for all frequencies. As shall be shown, this dramatically accelerates the spectral analysis of circuits.

To compute the admittance spectrum for exterior nodes, reduce all algebraic nodes $$Y_{ee}^r(\omega) = Y_{ee} - Y_{ea}\frac{1}{(j\omega+\varepsilon)1+Y_{aa}}Y_{ae}.$$

Unless a matrix has an explicit (ω) dependence, it is frequency independent. Such matrices need to be calculated only once for a complete spectral analysis. Here the 1 is a diagonal unit matrix in the space of algebraic nodes.

Define the Laplace transform variable $s\equiv j\omega$. In order for the RLC circuit to be stable, the characteristic polynomial, $$P(s) = \det[(s+\varepsilon)1+Y_{aa}],$$

must satisfy the Hurwitz criterion. It must have real coefficients of powers of s. The roots are in the left hand complex s-plane. The s ensures this condition is met even in the lossless circuit limit. Roots are either negative real, or they come in complex conjugate pairs with negative real parts. The roots are dynamical modes of the system.

To address spectral properties, it is better to work with $H\equiv jY_{aa}$. The Fourier transform of the admittance evolves with time by multiplying by $e^{jHt}$. H is a square symmetric matrix. It is real for lossless circuits and complex for lossy circuits. A square complex matrix H may be diagonalized with left and right eigenvector matrices W' and V, respectively $$HV=VE; W'H=EW'.$$

E is a diagonal matrix of eigenvalues corresponding to resonant frequencies of the circuit. V is a matrix of eigenvectors, which are linear superpositions of the algebraic nodes.

Symmetric means that the non-conjugate transpose $H^T=H$. A diagonal matrix satisfies $E^T=E$. Then a sequence of substitutions leads to $$V^TH^T=E^TV^T \to V^TH=EV^T \to W'=V^T$$

Multiply the left hand side by $V^T$ and the right hand side of the second by V. The result is $$V^TVE=V^THV=EV^TV.$$

Inasmuch as this shows $K\equiv V^T V$ commutes with a non-unit diagonal matrix, it must also be diagonal. It follows that $$V^{-1}=\frac{1}{K}V^T;\; H=VEV^{-1};$$

In the limit of lossless circuits, H is real symmetric, K→1, eigenvectors are orthonormal, and eigenvalues are real.

The Hurwitz stability property requires real parts to be paired, $E_k=\pm w_k+j\Gamma_k$, or to be pure imaginary $E_k=j\Gamma_k$. This symmetry helps ensure the admittance obeys $Y(-\omega)=Y(\omega)^*$; that is, the admittance is Fourier transform to a real causal convolution function of time.

The inverse matrix has a representation in terms of eigenvalues and eigenvectors, $$G_{ij}(\omega) \equiv \left(\frac{1}{(j\omega+\varepsilon)1+Y_{aa}}\right)_{ij} = \sum_k V_{ik}\frac{1}{j(\omega-w_k)+\varepsilon+\Gamma_k}V_{kj}^{-1}$$

The real part is positive definite and satisfies a frequency integral sum rule, $$1 = \frac{2}{\pi}\int_0^\infty \Re G(\omega)d\omega.$$

Here 1 is a diagonal unit matrix in the space of algebraic nodes.

Real and imaginary parts are not independent. They are related by Cauchy principal value integrals, as in $$\Im G(\omega) = \frac{2\omega}{\pi}P\int_0^\infty \frac{\Re G(\omega')}{\omega'^2-\omega^2}d\omega'.$$

Here P indicates to take the principal value integral. They are a consequence of analyticity in the lower half ω plane. That is, all eigenvalues, and therefore poles of G, are in the upper half plane corresponding to decaying modes in the Fourier transform time variable.

Then the exterior node spectral admittance is, $$Y_{ee}'(\omega) = Y_{ee} - Y_{ea}G(\omega)Y_{ae}^T.$$

It is the sum of a real frequency independent term and a projection of G(w) from algebraic nodes to exterior nodes using a non-conjugate transpose inner product.

Modified Butterworth Van Dyke Model Example

Figure 5:
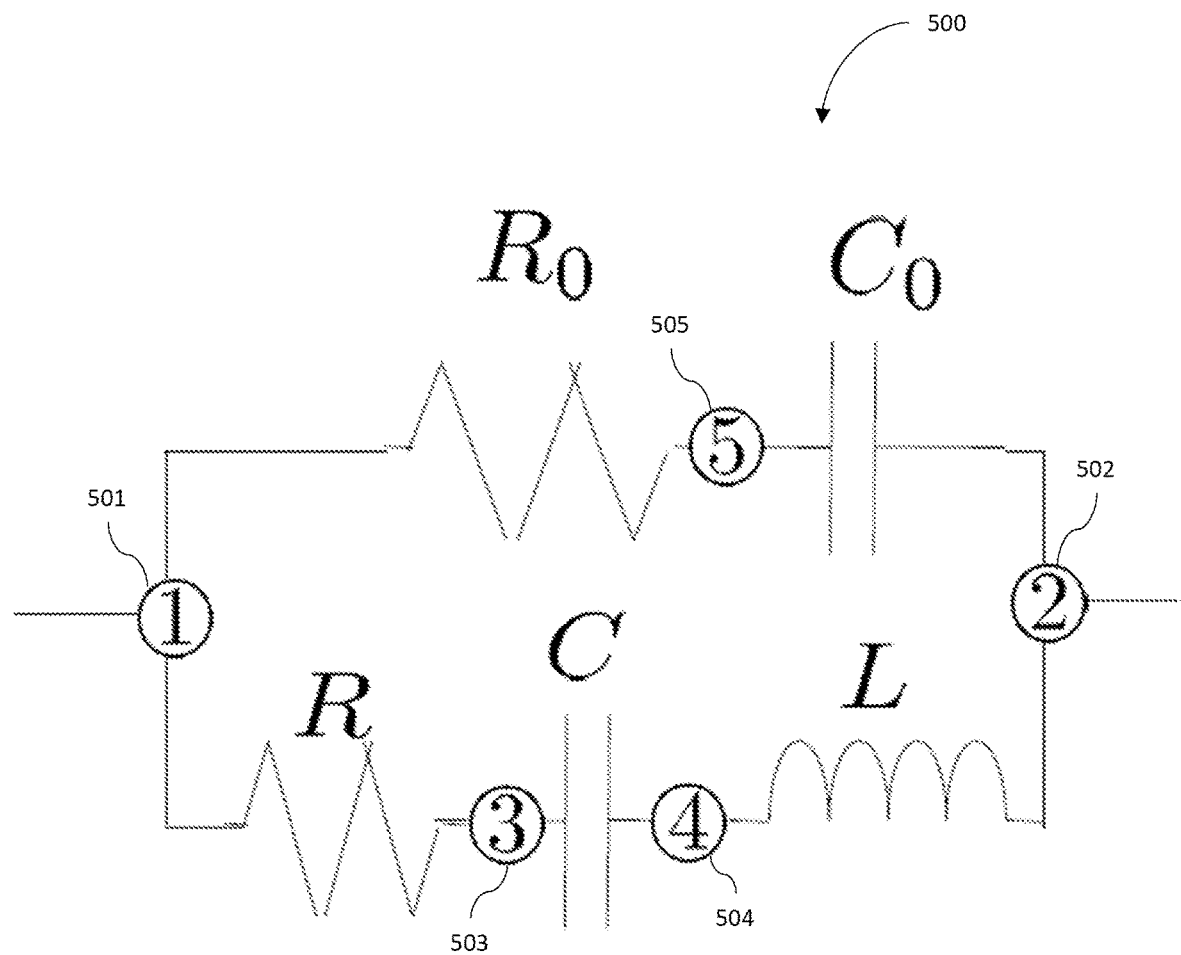
FIG. 5 shows a schematic diagram of circuit nodes in a Modified Butterworth Van Dyke (MBVD) model for an acoustic wave resonator.

FIG. 5 shows a Modified Butterworth Van Dyke (MBVD) model 500 for an acoustic wave resonator. It is used, for example, in the design of radio frequency filters for cell phones. FIG. 5 shows a diagram of circuit nodes and parts in a MBVD model 500. The parts comprise one inductor L, two capacitors C and $C_0$, and two resistors R and $R_0$. $C_0$ is called the static capacitance. The R, L, C in series is called the motional resonator. Conventional nodal analysis yields 5 circuit nodes. Nodes 501 and 502 are exterior circuit nodes, and nodes 503, 504, and 505 are interior circuit nodes.

Figure 6:
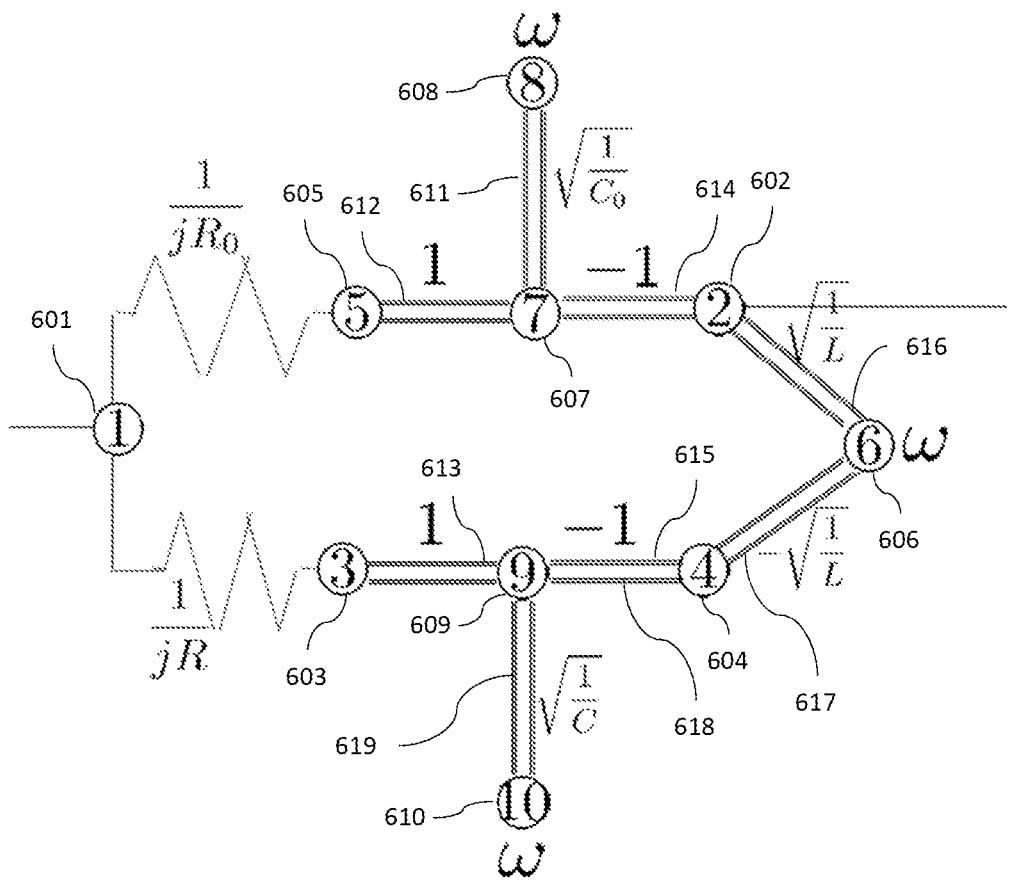
FIG. 6 shows a schematic diagram of algebraic node expansion of the MBVD model of FIG. 5.

FIG. 6 is a schematic diagram of the 10 node expanded admittance for the MBVD 500 of FIG. 5. The algebraic node expansion yields a frequency-dependent algebraic node 606 for the inductor, frequency-independent and frequency-dependent pairs of algebraic nodes 607, 608 for $C_0$, nodes 609, 610 for C, and inverters 611, 612, 613, 614, 615, 616, 617, 618, and 619. The labels on the inverters are the value of the inverter. The labels are mathematical expressions for the component Y/j values.

Connecting an MBVD model as a subcircuit in a filter circuit requires uses only the exterior e circuit nodes. Calculating the frequency dependence of the MBVD circuit uses only the algebraic nodes. The interior circuit nodes 603, 604, and 605 and the algebraic nodes 607 and 609 of the two capacitors C and $C_0$, respectively, may be reduced. The Kron reduction procedure is to set the currents for these nodes to zero and to solve for the relation of currents and voltages of the remaining nodes. The calculation proceeds in the order of nodes that do not have zeros on the diagonal. The result is a five-node reduced admittance matrix for the MBVD that has only two exterior circuit nodes and three frequency-dependent algebraic nodes, represented as:

$$Y_5^{BVD} = j\omega\begin{pmatrix}0&0&0&0&0\\0&0&0&0&0\\0&0&1&0&0\\0&0&0&1&0\\0&0&0&0&1\end{pmatrix} + \begin{pmatrix}\frac{1}{R_0}&-\frac{1}{R_0}&0&-\frac{j}{\sqrt{L}}&-\frac{1}{R_0\sqrt{C_0}}\\-\frac{1}{R_0}&\frac{1}{R_0}&0&\frac{j}{\sqrt{L}}&\frac{1}{R_0\sqrt{C_0}}\\0&0&0&\frac{j}{\sqrt{LC}}&0\\-\frac{j}{\sqrt{L}}&\frac{j}{\sqrt{L}}&\frac{j}{\sqrt{LC}}&\frac{R}{L}&0\\-\frac{1}{R_0\sqrt{C_0}}&\frac{1}{R_0\sqrt{C_0}}&0&0&\frac{1}{R_0C_0}\end{pmatrix}.$$

The reduced admittance of the MBVD has the characteristic form of the sum of frequency times a diagonal unit matrix and a frequency independent complex symmetric matrix.

Figure 7:
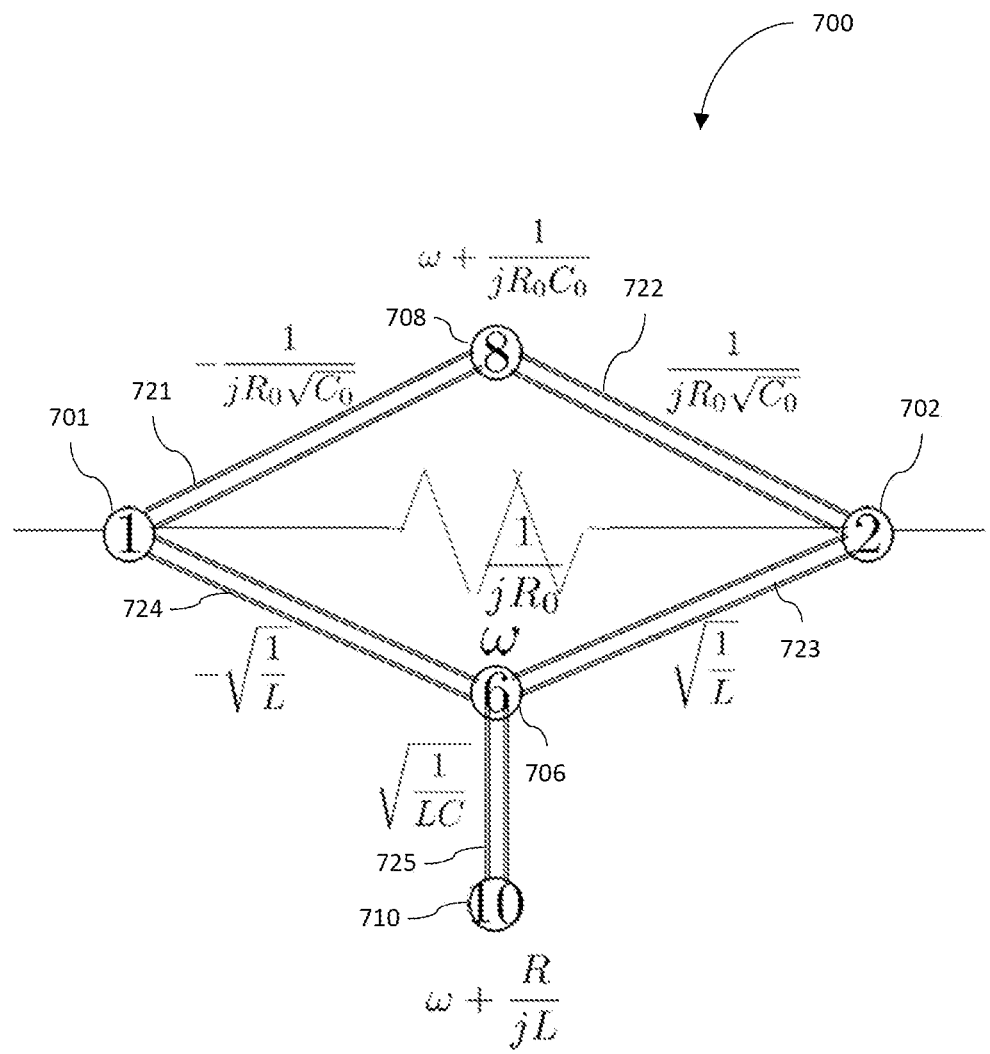
FIG. 7 shows a schematic diagram of a reduced MBVD model after elimination of interior circuit nodes.

FIG. 7 shows a schematic diagram of the reduced admittance matrix of an MBVD 700, corresponding to the representation of the reduced admittance matrix of the MBVD above. The labels are mathematical expressions for the component values of the admittance. A label on a single node denotes that it is the value of the diagonal element. Labels on inverters 721, 722, 723, 724, and 725 are the values of the inverter. The reduction process has added frequency independent values to the ω on the diagonal for frequency dependent nodes. Node 708, which corresponds to $R_0$ and $C_0$ for the static capacitance, is directly connected to exterior nodes 701 and 702. The resistor contributes to the direct term $\tilde{Y}_{ee}$. For the motional branch resonator corresponding to the series R, L and C in FIG. 5, only node 706 connects to the exterior nodes. Node 710 connects only to node 706.

The H is j times the algebraic node submatrix of the frequency-independent part of the reduced admittance. The eigenvalues of H are $$E_\pm = \pm\sqrt{\frac{1}{LC}-\left(\frac{R}{2L}\right)^2}+\frac{jR}{2L} \equiv \pm\frac{1}{\sqrt{LC}}e^{\pm j\Theta}; E_3 = \frac{j}{R_0C_0}$$

The first two eigenvalues are the resonant frequencies of the motional resonator damped by the resistor. The third eigenvalue is the exponential decay rate for the static capacitance $R_0$, $C_0$ part of the circuit. The right eigenvectors for an MBVD can be expressed in terms of loss angle θ:

$$V = \begin{pmatrix}\frac{1}{\sqrt{1+e^{2j\Theta}}} & \frac{1}{\sqrt{1+e^{-2j\Theta}}} & 0\\ \frac{-e^{j\Theta}}{\sqrt{1+e^{2j\Theta}}} & \frac{e^{-j\Theta}}{\sqrt{1+e^{-2j\Theta}}} & 0\\ 0 & 0 & 1\end{pmatrix}$$

The eigennodes are linear superpositions of the original algebraic nodes. For a lossless MBVD, the angle θ is zero, and the eigennodes are orthonormal. For lossy circuits, the eigennodes in general are not orthonormal.

Figure 8:
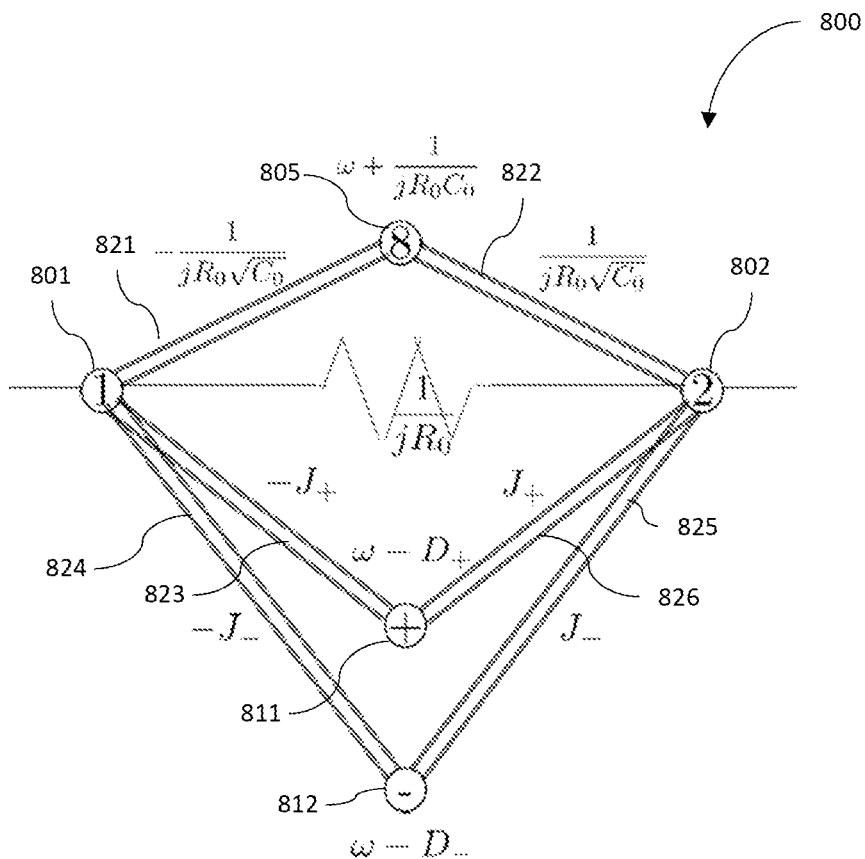
FIG. 8 shows a schematic diagram of the reduced MBVD model of FIG. 7 after diagonalization of the Hurwitz matrix.

FIG. 8 shows a schematic diagram of the admittance matrix after diagonalization of H 800. The algebraic parts nodes 706 and 710 of FIG. 7 have been replaced by algebraic eigennodes 811 and 812. These are linear combinations of algebraic parts nodes that diagonalize H. The admittance matrix after diagonalization becomes a transversal array. That is, the algebraic eigennodes are only connected to exterior nodes by J-inverters 821, 822, 823, 824, and 825. Node 805 is already an eigennode. Eigennodes do not connect to each other.

The MBVD is only one example of the nodal analysis of the algebraic node transformation method. An infinite number of other circuits comprised of R, L, and C parts may be analyzed using algebraic node expansion and Kron reduction. They will show similar characteristics.

Numerical Evaluation of Greens Function

Figure 2:
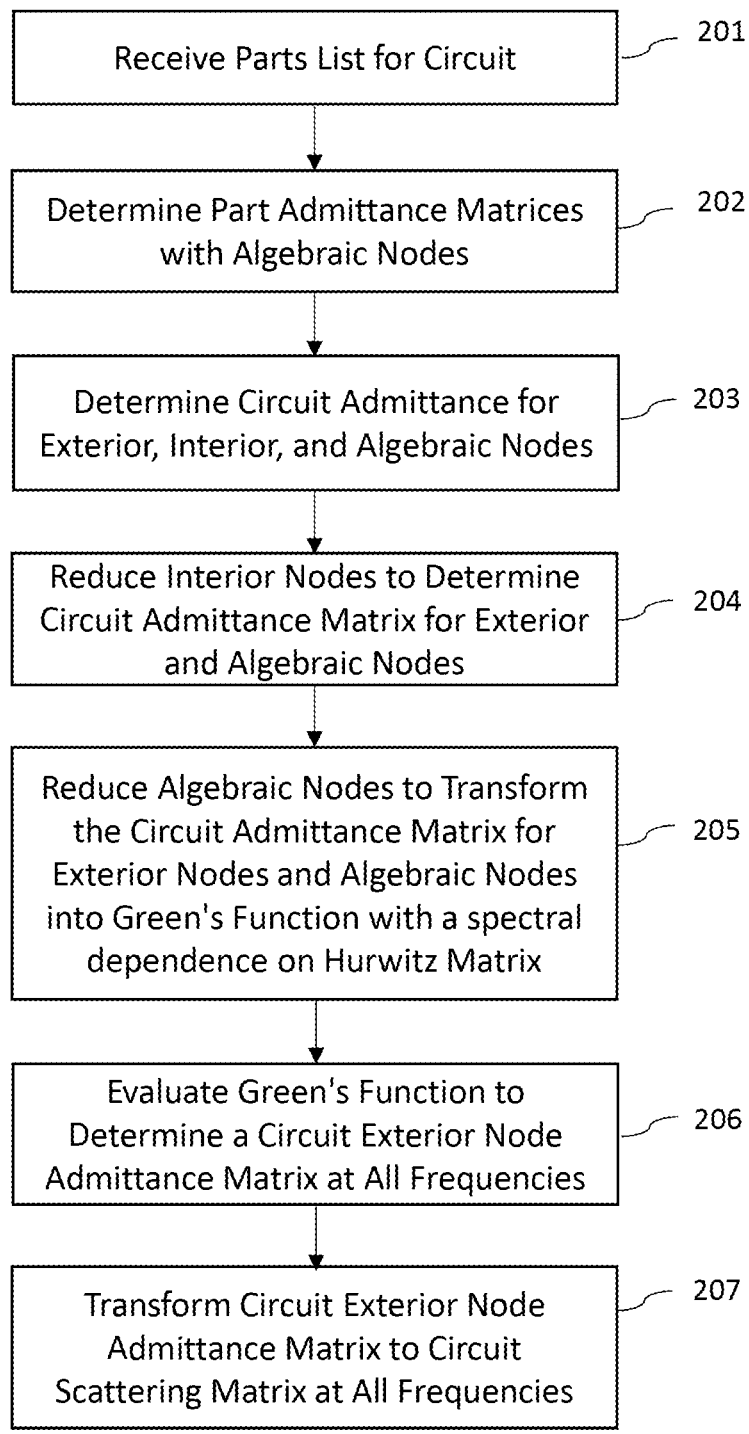
FIG. 2 shows a flow chart of a method of electronic circuit spectral analysis by algebraic node transformation.
Figure 9:
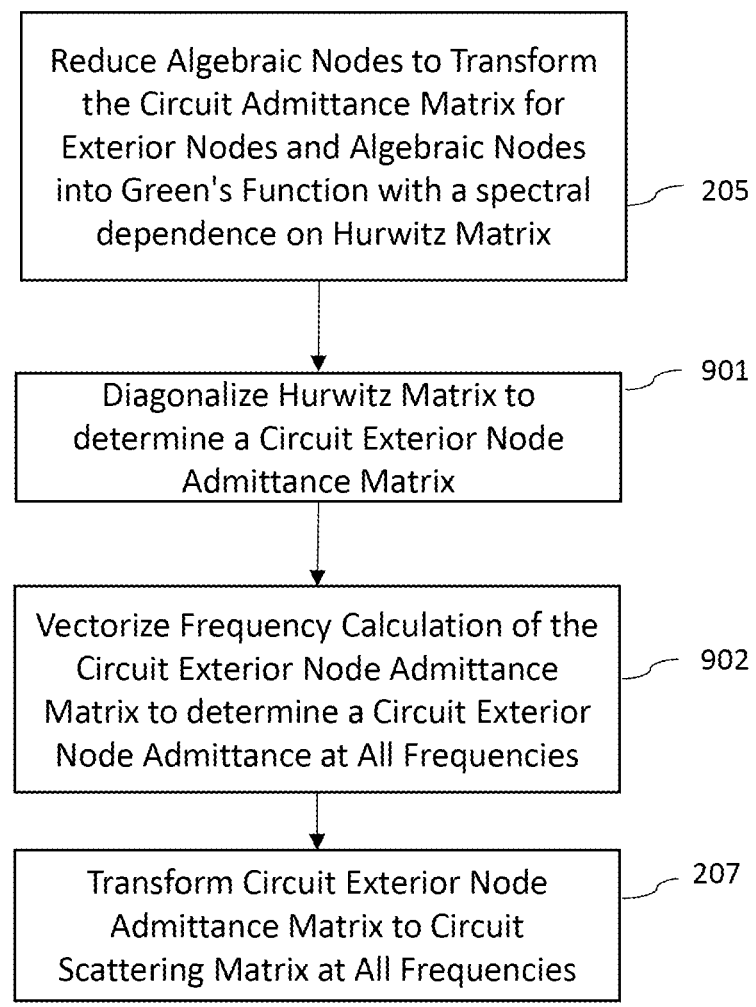
FIG. 9 shows a flow chart of calculation of spectra of electronic circuits using diagonalization for small-size Hurwitz matrices.

FIG. 9 shows a flow diagram of one method of evaluation of Green's Function to determine a circuit exterior node admittance at all frequencies, as shown in step 206 of FIG. 2. This uses Hurwitz matrix diagonalization and vectorization. The method of FIG. 9 is most suitable for small-size Hurwitz matrices.

At step 901, the Hurwitz matrix H, which as discussed above is j times the algebraic node submatrix of admittance, is diagonalized using efficient linear algebra techniques. Most of the CPU time is spent in the diagonalization. The matrix dimension N is the sum of the number of inductors and the number of capacitors. The CPU time for diagonalizing non-sparse matrices scales as $N^3$. The memory scales as $N^2$. Diagonalization is fast for small circuits. The exterior node admittance at one frequency is calculated as a sum over eigennodes of the Hurwitz matrix.

At step 902, the calculation over many frequency points is vectorized, i.e. a style of computer programming where operations are applied to whole arrays instead of individual elements. Multiple frequencies are calculated almost as quickly as a single frequency. A sweep of, for example, 1000 frequency points using the fast circuit spectral analysis method requires CPU time comparable to calculating a single frequency point in the conventional method.

Here, the Hurwitz matrix is diagonalized once independent of the number of frequency points. The sweep over frequencies may be vectorized and requires negligible CPU time.

At step 207, the method continues, as in FIG. 2, where the circuit exterior node admittance is transformed to a circuit scattering matrix at all frequencies of interest. For filter, duplexer, and multiplexers applications, the S matrix is a suitable design characterization. For other kinds of circuits and applications, equivalent matrix representations for circuit performance (e.g. admittance, impedance, and ABCD) may be more appropriate. For a two port device, an S-matrix is a 2×2 matrix containing four S-parameters, or scattering parameters. An S-matrix is a convention used to describe the performance of linear electrical networks. S(1,2) is the transfer function from port 1 to port 2 of the electronic circuit. S(1,2) is essentially the "insertion loss" of the electronic circuit with a change in numeric sign (e.g. S(1,2)=−3 dB is equivalent to an insertion loss of 3 dB). Similarly S(2,1) is the transfer function from port 2 to port 1 of the electronic circuit. S(1,1) is the reflection at port 1 and S(2,2) is the reflection at port 2. For a three port device, such as a duplexer, the S-matrix is a 3×3 matrix. And so on.

For large circuits, the CPU time and memory required to diagonalize the Hurwitz matrix may be too large.

Figure 10:
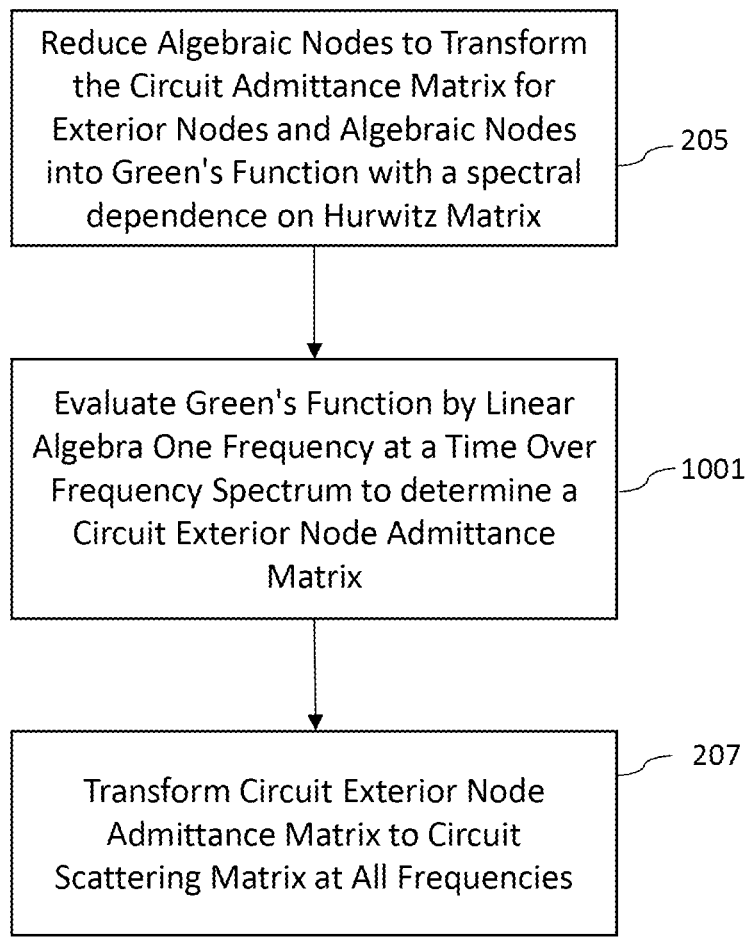
FIG. 10 shows a flow chart of the calculation of spectra of electronic circuits using linear algebra appropriate for intermediate-size Hurwitz matrices.

FIG. 10 shows a flow diagram of another method of evaluation of Green's Function using linear algebra that may be more appropriate for intermediate size Hurwitz matrices. The goal is the same, to determine a circuit exterior node admittance at all frequencies, as shown in step 206 of FIG. 2.

At step 1001, Green's Function is evaluated by linear algebra one frequency at a time over a frequency spectrum of interest. Linear algebra methods, such as LU decomposition, are used to calculate the effect of $(\omega-\tilde{H})^{-1}$. The linear algebra is done one frequency point at a time, rather than array processing (or vectorizing) the frequency dependence. This will be more efficient than the conventional circuit spectral analysis method, because the work of calculating the required submatrices (such as the Hurwitz matrix and the exterior to algebraic node admittance) need only be done once regardless of the number of frequency points. However, this frequency loop is not easily vectorized, and the CPU time will scale linearly in the number of frequency points.

Figure 11:
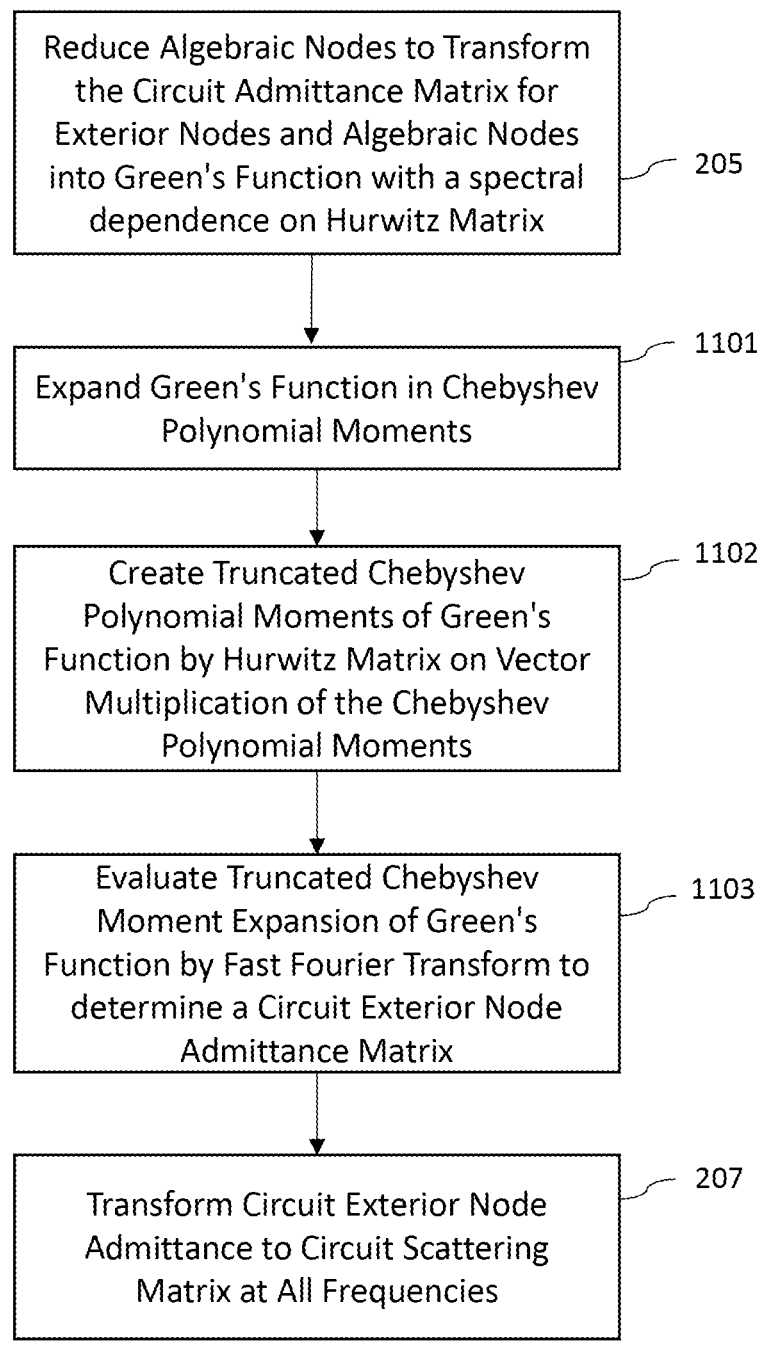
FIG. 11 shows a flow chart of calculation of spectra of electronic circuits using the Kernel Polynomial Method appropriate for large-sized Hurwitz matrices.

FIG. 11 shows a flow diagram of yet another method of evaluation of Green's Function to determine a circuit exterior node admittance at all frequencies, as shown in step 206 of FIG. 2. It uses the Kernel Polynomial Method (KPM) which is appropriate for very large sparse Hurwitz matrices for lossless circuits.

At step 1101, the Green's Function is expanded in Chebyshev Polynomial Moments. A Chebyshev moment expansion is analogous to a Fourier expansion.

At step 1102, a finite number of Chebyshev Polynomial Moments of Green's Functions are created by Hurwitz matrix on vector multiplication. This provides a truncated moment expansion. The frequency resolution improves with increasing the number of moments.

At step 1103, truncated Chebyshev Polynomial Moment Expansion of Green's Function is evaluated by Fast Fourier Transform. The Kernel in the name comes from the use of apodization (or reweighting) of the moments in the expansion to minimize the Gibbs phenomenon.

The details of the KPM are as follows. It is a method developed in quantum physics and chemistry to analyze spectra by evaluating Green's functions. Here KPM is adapted to fast circuit spectral analysis. For large sparse Hurwitz matrices it scales linearly in N for both CPU requirements and memory requirements. The analogue of the Hurwitz matrix for Green's function evaluation in quantum systems is a Hamiltonian matrix, which is Hermitian. KPM is routinely applied to physical systems whose Hamiltonian matrices have dimension of more than a billion.

KPM uses expansions of the Green's function in a polynomial series. If the eigenspectrum of the Hurwitz matrix is bounded above and below, all eigenvalues may be scaled to the range between −1 to +1. Let a hat Â symbolize scaling of variables to the range of support of the polynomial. Then, there is an operator identity for the Dirac delta function, $$\delta(\hat{\omega} - \hat{H}) = \frac{1}{\pi\sqrt{1-\hat{\omega}^2}}\left[1 + 2\sum_{n=1}^{\infty}T_n(\hat{\omega})T_n(\hat{H})\right].$$

Here, the $T_n$ are Chebyshev polynomials of the first kind. This identity may be applied to generate a truncated Chebyshev polynomial expansion of the imaginary part of the Green's function (or real part of the admittance)

$$\tilde{Y}_{ea}\delta(\hat{\omega} - \hat{H})\tilde{Y}_{ae} \approx \frac{1}{\pi\sqrt{1-\hat{\omega}^2}}\sum_{n=0}^{N}g_n T_n(\hat{\omega})\mu_n; \quad \mu_n \equiv \tilde{Y}_{ea}T_n(\hat{H})\tilde{Y}_{ae}.$$

The real part can be calculated from the imaginary part by the analyticity relations. The $g_n$ are apodization weights used to minimize Gibbs oscillations in truncation of a series. The Chebyshev moments $\mu_n$ are calculated by the Hurwitz matrix on vector multiplies using the Chebyshev polynomial recursion, which is a numerically stable operation. If the multiplies can be reduced to rules, the storage requirement may be only three vectors having the dimension of the Hurwitz matrix. The number of moments needed scales linearly with the inverse frequency resolution desired. Since Chebyshev polynomial expansions are truncated Fourier series, evaluation of spectra may be accomplished by fast Fourier transforms.

If the eigenvalue spectrum is unbounded, then other choices of polynomial with infinite or semi-infinite support may be preferred, such as Hermite, Laguerre and Legendre. KPM can be applied with minimal modification to the real symmetric Hurwitz matrices appropriate for large lossless circuits. The KPM needs further development to be applicable to lossy circuits.

In addition to the three (diagonalization, linear algebra, kernel polynomial) methods detailed above, there are other Green's function evaluation methods widely used in physics that may be adapted to circuit spectral analysis. A Hamiltonian matrix for quantum physics plays a similar time evolution role as the Hurwitz matrix for circuits. For example, a time series of the admittance can be generated by equating time evolution as multiplication by the exponential of the time multiplied by the Hamiltonian, as discussed above for a causal Green's function. This time series may be analyzed by Fourier methods or by Filter Diagonalization methods to calculate the exterior circuit admittance spectrum. The most appropriate numerical method will depend on the particular circuit being analyzed and the software implementation of the method.

Applications to Spectral Analysis

Figure 12:
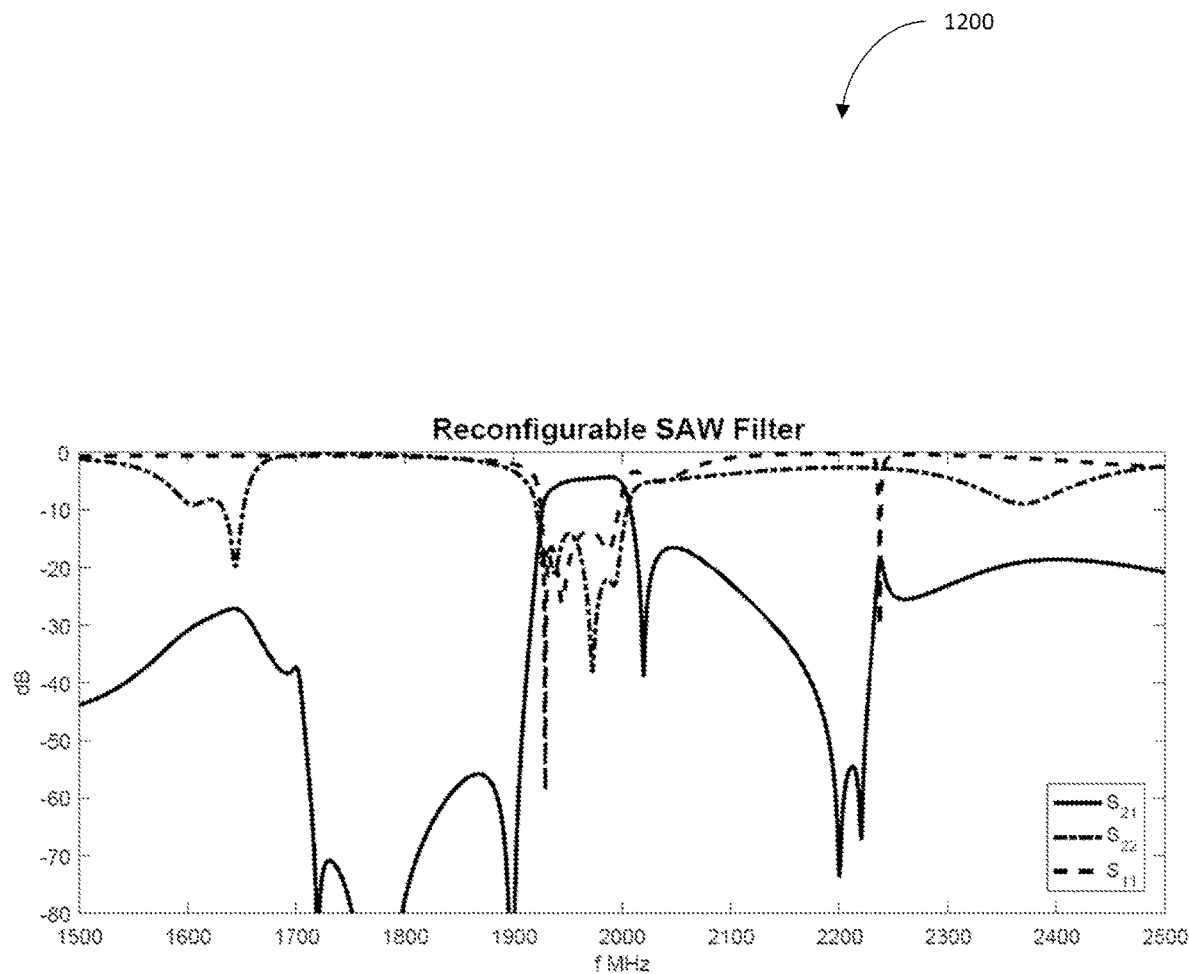
FIG. 12 shows an S matrix for a reconfigurable SAW filter circuit example.

FIG. 12 is a graph 1200 of S-parameters for a reconfigurable SAW (surface acoustic wave) filter circuit example. The calculations use MATLAB 2016a on one core of a Lenovo laptop. This example is a reconfigurable filter project which tunes passives coupled to acoustic wave resonators to change the filter response. The model consists of an in-line ladder of eight MBVDs, ten inductors and nine capacitors. Each MBVD contains two capacitors, one inductor and two resistors. As such, the total Hurwitz matrix dimension is 43.

The MBVD parts values are taken from fits to finite element simulations of the electroacoustic properties of $LiTaO_3$ SAW resonators, which in turn have been validated by experiment. The Y matrix is sparse. Graph 1200 shows three terms of the S matrix (in dB) of the reconfigurable SAW filter circuit vs. frequency (in MHz) calculated by the algebraic node transformation method. S(1,2) is the transfer function from port 1 to port 2 of the reconfigurable SAW filter circuit. S(1,1) is the reflection at port 1 and S(2,2) is the reflection at port 2 of the reconfigurable SAW filter circuit.

Figure 13:
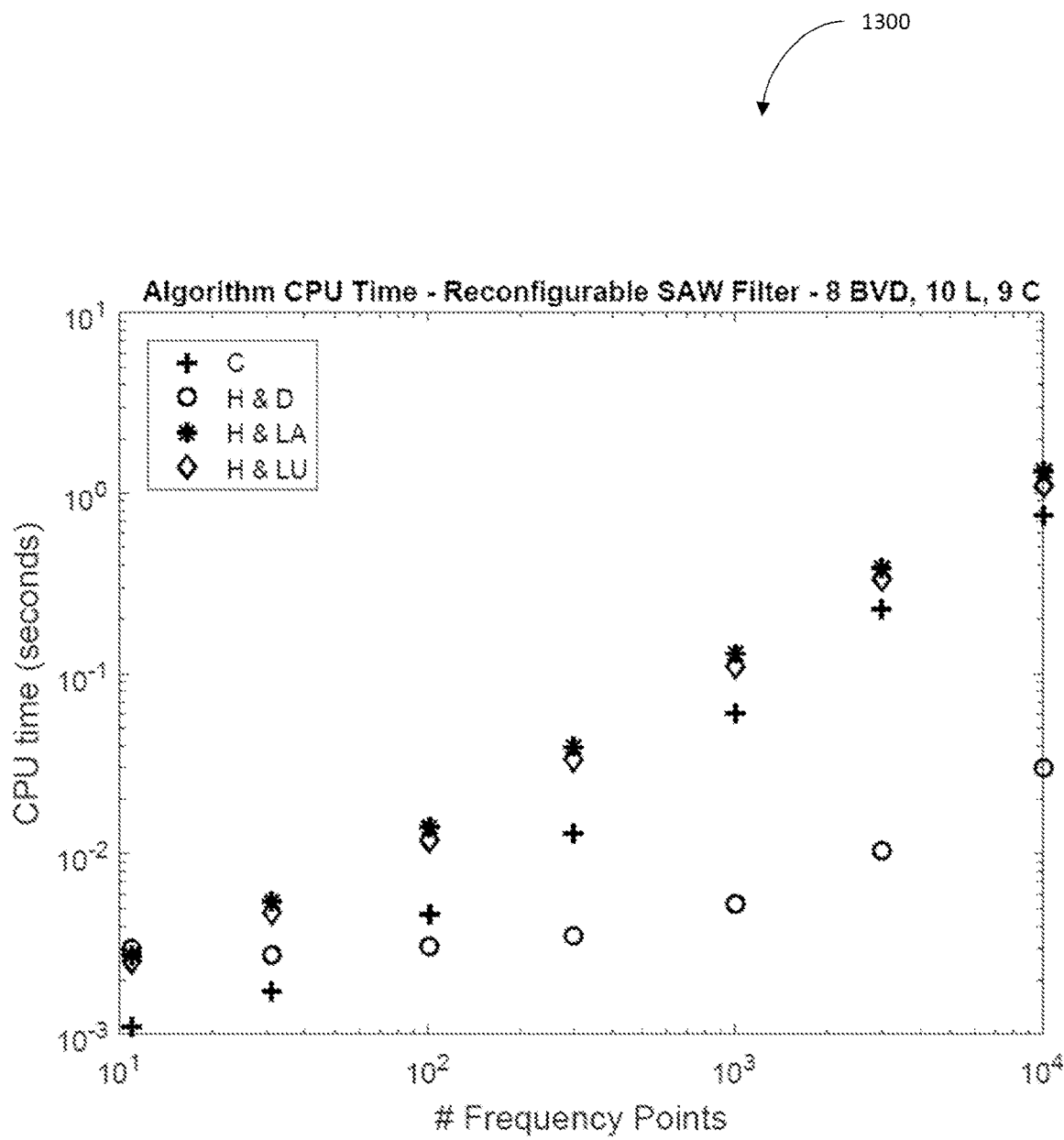
FIG. 13 is a graph of central processing unit ("CPU") time versus number of frequency points for various methods of calculating the S matrix of the reconfigurable SAW filter example of FIG. 12.

FIG. 13 shows a log-log plot 1300 of a number of frequency points versus CPU time for circuit spectral analysis methods. The data indicated with a + symbol correspond to a conventional circuit spectral analysis method in FIG. 1. It has been mexed in MATLAB (that is, accelerated by compilation in C++). Its CPU time scales linearly with the number of frequency points. The data with a o symbol labeled H&D correspond to the algebraic node transformation method using Hurwitz matrix diagonalization, as shown in FIG. 9. The data with a * symbol labeled H&LA correspond to the fast circuit spectral analysis method using the linear algebra, as shown in FIG. 10. The data with a ◊ symbol labeled H&LU also correspond to the fast circuit spectral analysis method using the linear algebra, as shown in FIG. 10. The calculation uses LU decomposition with MATLAB's lu·m function. Neither of these linear algebra approaches using the Hurwitz matrix are processed with MATLAB's mex function. With large numbers of frequency points, the Hurwitz diagonalization code is up to 25 times more efficient than the conventional linear algebra code. A typical reconfigurable SAW filter design application would require 2000 frequency points to give 0.5 MHz resolution.

Figure 14:
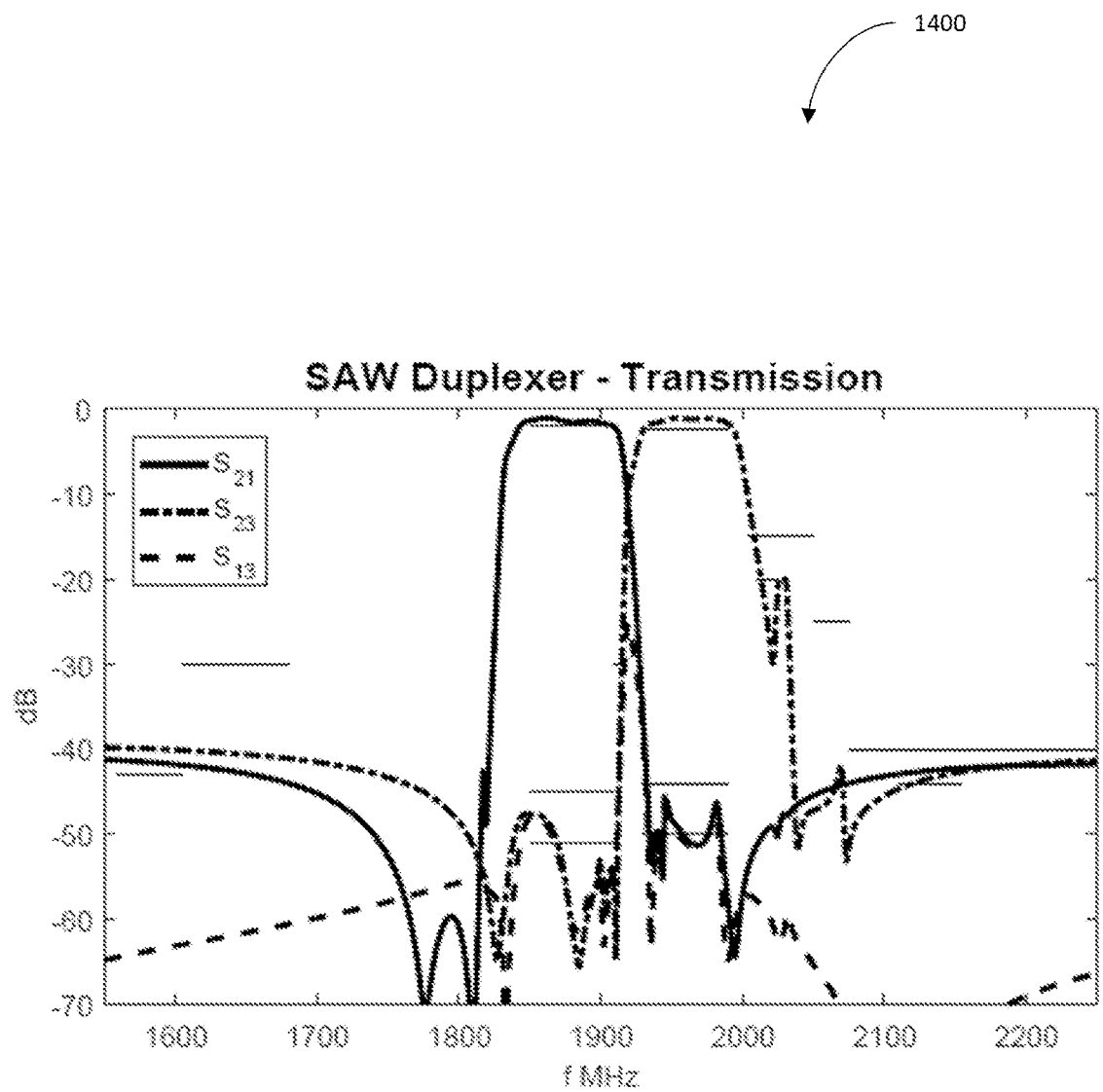
FIG. 14 shows an S matrix for a SAW duplexer example.

FIG. 14 shows a graph 1400 of an example of a Band 2 SAW duplexer S matrix (in dB) versus frequency (in MHz). The design consists of 29 MBVDs connected on a $LiTaO_3$ piezoelectric substrate with aluminum metallization connecting ports. A Y matrix is modeled by a 57 port electromagnetic layout calculation. A layout matrix is a distributed part whose admittance varies slowly with frequency. For the purposes of comparing methods, it is taken to be a frequency independent reactance (or FIR). There are also two inductors connecting to exterior ports. The Hurwitz matrix dimension is the sum of three for each MBVD and one for each inductor for a total of 89. The admittance matrix is dense.

Figure 15:
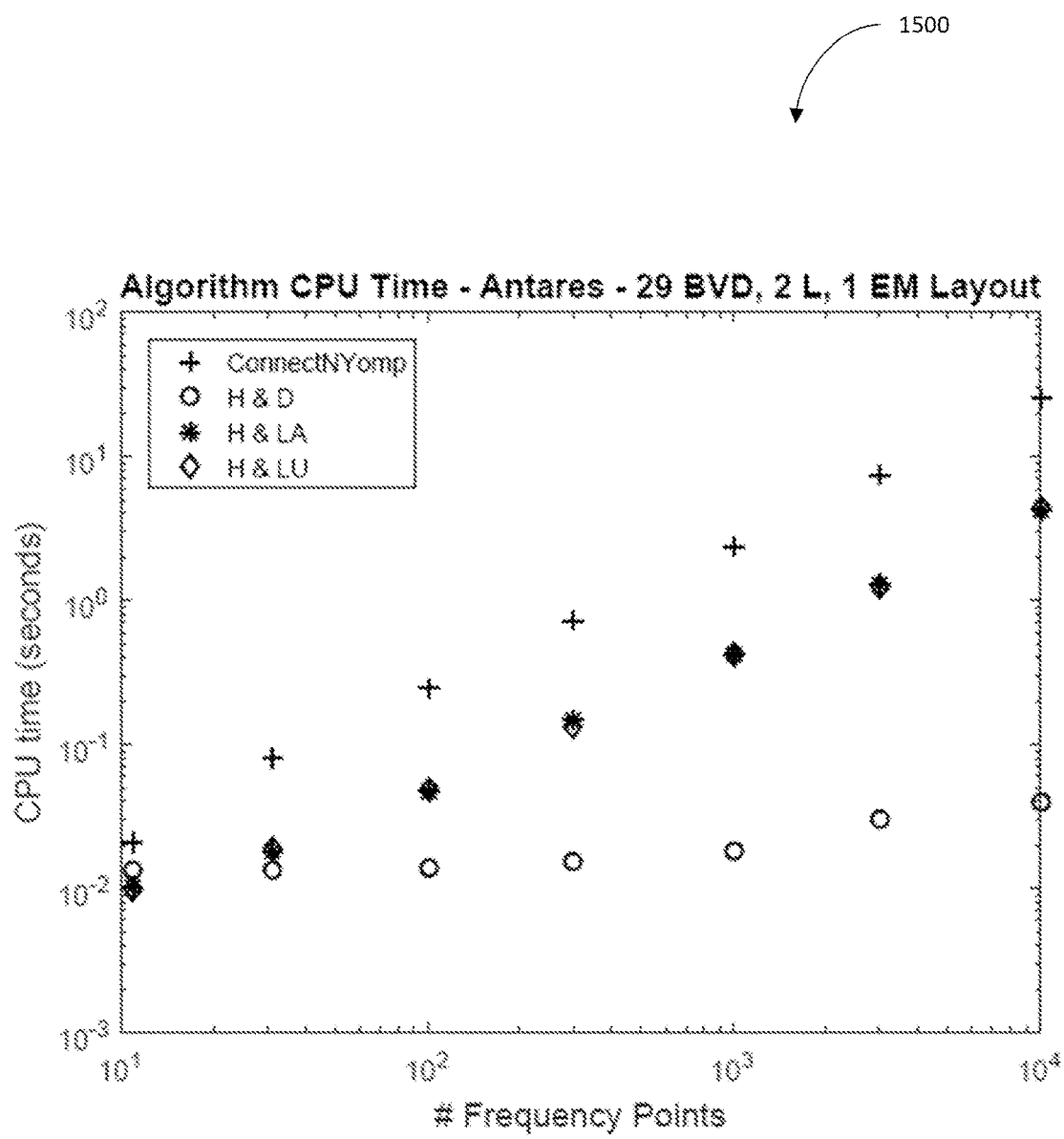
FIG. 15 is a graph of CPU time versus number of frequency points for various methods for calculating the S matrix of the SAW duplexer example of FIG. 14.

FIG. 15 is a log-log plot 1500 comparing the number of frequency points versus CPU time for various circuit spectral analysis methods. The same symbol labels are used as in FIG. 13. For the number of frequency points required for typical applications, the algebraic node transformation method using Hurwitz matrix diagonalization, shown in FIG. 9, is up to 350 times more efficient than the conventional spectral analysis methods. The algebraic node transformation method using the Hurwitz matrix with linear algebra, shown in FIG. 10, is faster than the conventional spectral analysis method by a factor of about six.

Pole Zero Analysis

'Analysis' starts with a circuit and predicts its response. 'Synthesis' is the inverse process of starting with a desired response and finding circuits that can reproduce it. For example, the response function may be a scattering matrix. For each channel, the response F(s) is specified as a rational function of frequency s=jω, a ratio of finite order numerator polynomial P(s) and equal or higher order denominator polynomial Q(s):

$$F(s) = \frac{P(s)}{Q(s)}; \; s = j\omega. \tag{34}$$

In order for the electrical response of the circuit to be stable, the numerator and denominator polynomials must both be 'Hurwitz'. This is a set of constraints on the type of polynomials. Monic polynomials may be completely specified by their roots, so the Hurwitz conditions may be restated in terms of the roots. Roots of numerator polynomials are called 'zeros'. Roots of the denominator polynomial are called 'poles'.

Characterization of a circuit response by its poles and zeros is termed 'pole zero analysis'. This is an important tool for network synthesis and characterization. Ideal components in a ladder topology circuit may be synthesized by matching poles and zeros to a continued fraction expansion of the driving point admittance. In principle, for ideal components equivalent circuit transformations enable infinite variations of circuits to be found that meet pole zero objectives.

In practice, real components are lossy and deviate from the ideal model. Realizing the pole zero objectives may be difficult. Real circuits need to be characterized. Real component parameters may need to be tuned, searched and optimized to recover pole zero objectives while maintaining realizability. The poles and zeros may also need to be optimized to minimize circuit complexity and loss with available components.

Efficient methods for extracting poles and zeros are needed for synthesis and characterization. The poles and zeros are distributed in the complex ω-plane. They are found by extending scattering matrix calculations to complex frequencies. Minima are zeros of numerator polynomials and maxima are poles of denominator polynomials. For the surface acoustic wave device examples considered here, the search covers a two dimensional space of real frequencies over a several hundred MHz range and imaginary frequencies in the ±100 MHz range. Typical searches at high resolution require S matrix evaluations at up to a million complex frequencies.

Figure 16:
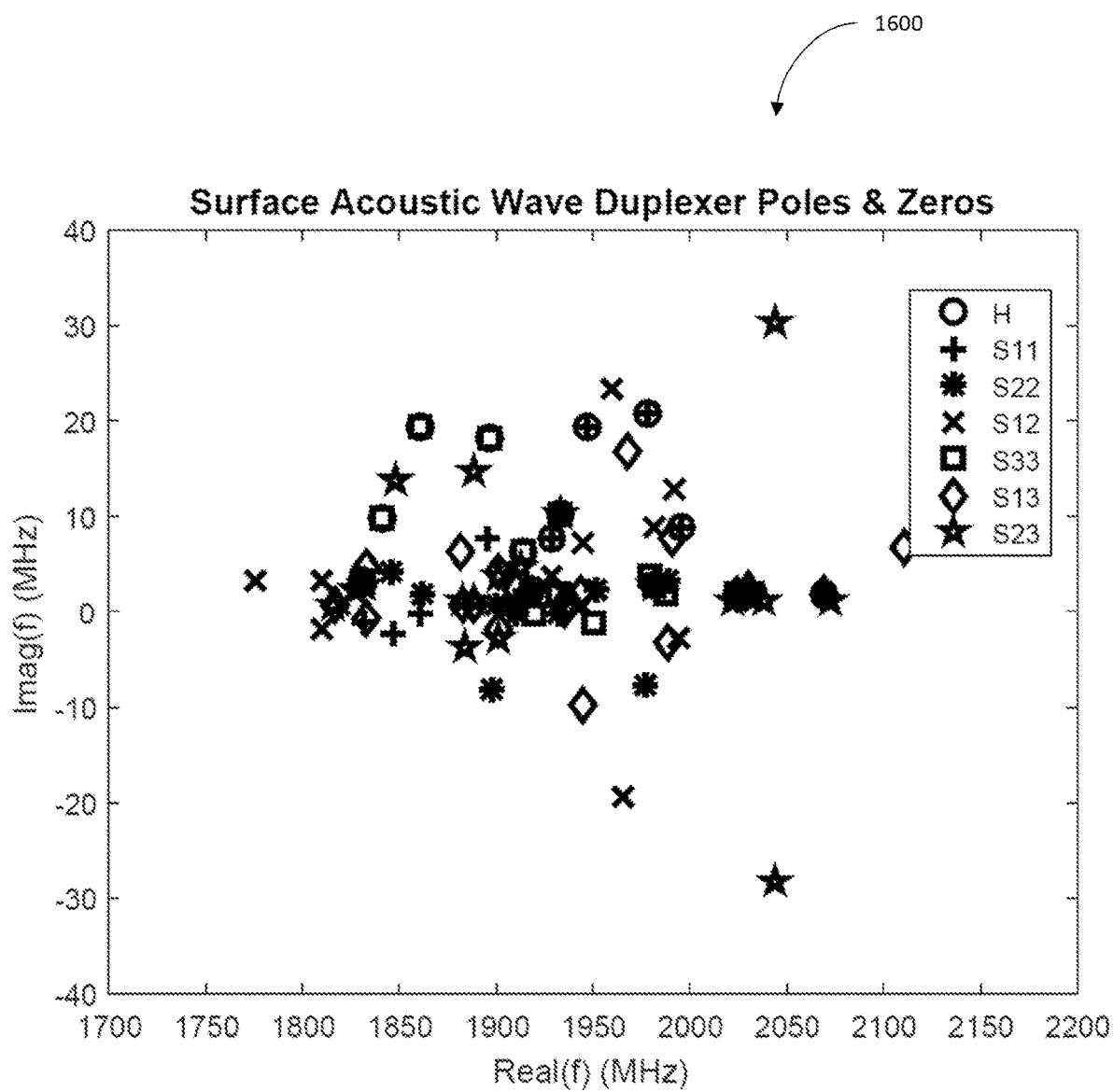
FIG. 16 shows poles and zeros of the SAW duplexer example of FIG. 14.

For example, FIG. 16 shows the poles and zeros extracted for the SAW duplexer example. H denotes poles from zeros of the denominator Hurwitz polynomial in common with all channels. The ports are labeled 1 for Tx, 2 for antenna and 3 for Rx. $S_{11}$ denotes reflection zeros for the Tx channel, $S_{12}$ denotes transmission zeros between Tx and antenna, $S_{32}$ denotes transmission zeros for the Rx channel, etc. The pole zero structure is very complex, due to strong electromagnetic cross coupling in the metal on piezoelectric layout connecting the SAW resonators.

Pole zero analysis can be done either using the conventional spectral analysis method depicted in FIG. 1, or using the new spectral analysis method shown in FIG. 2. The results are identical. However, the new method is approximately two hundred times faster. On a single laptop core, a pole zero calculation takes less than a second of cpu time. The conventional method requires minutes. Such orders of magnitude increase in speed enables real time synthesis, in which a change in component parameters instantaneously changes a display of poles and zeros.

For large numbers of frequency points, these examples demonstrate an orders of magnitude improvement in speed for the algebraic node transformation method compared to the conventional spectral analysis method. The details of the performance comparison between methods will depend on the specific circuit, the specific software and hardware implementation, and the specific needs of the application.

Designing a Filter

Figure 17:
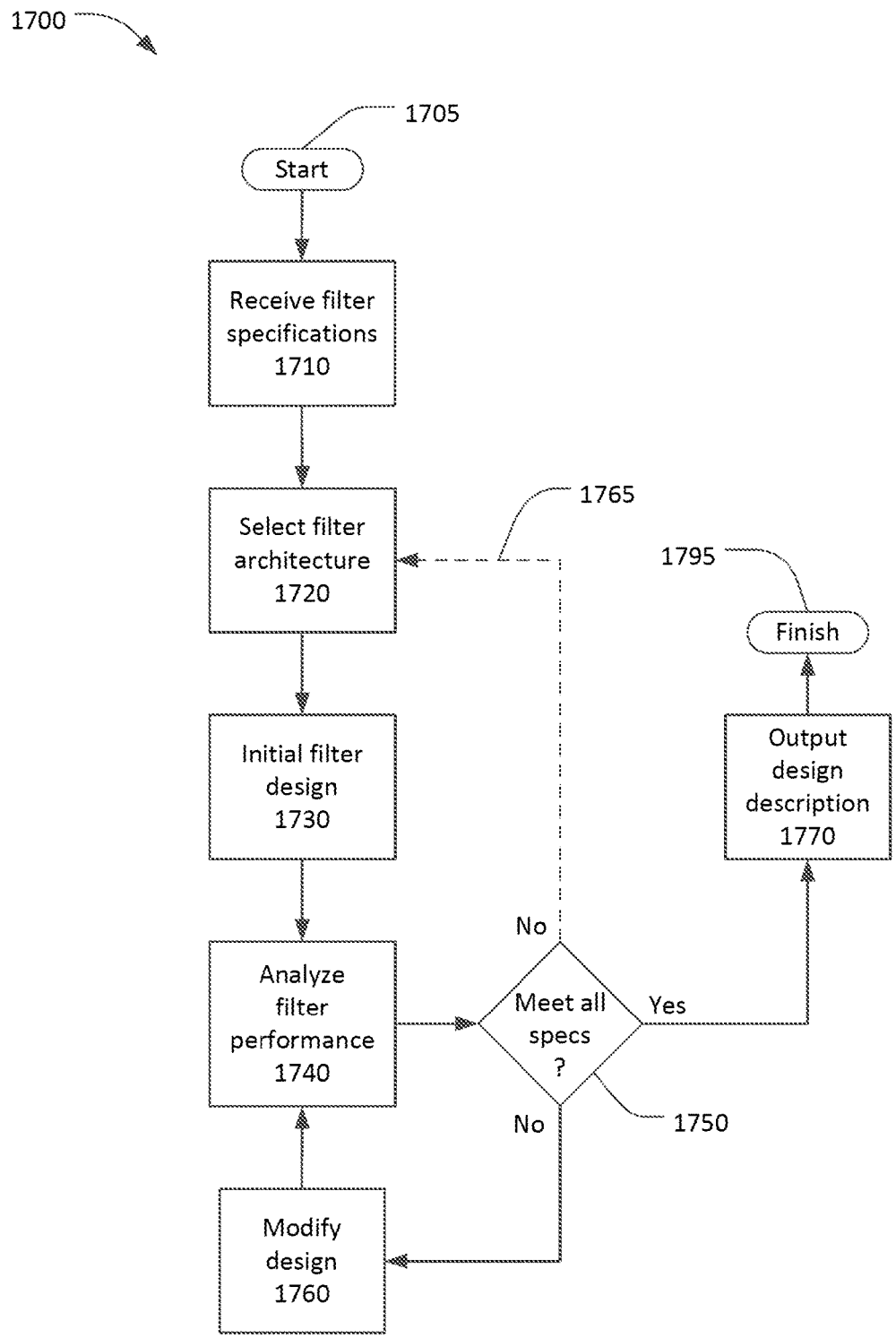
FIG. 17 shows a flow chart of a process for designing a SAW filter.

FIG. 17 is a flow chart of a process 1700 for designing a microwave filter. The process 1700 starts at 1705 and ends at 1795 after the design of a filter meeting a set of specifications has been completed and a design description has been output. The process 1700 is cyclic in nature and all or portions of the process may be repeated iteratively until a successful filter design has been established. While the process 1700 is specific to designing a SAW filter, a similar process can be used for designing other types of filters, e.g., BAW, FBAW, TBAW, or MEMS filters.

At 1710, the set of filter specifications is received. The specifications may be received, for example, from a potential customer or may be developed by a filter supplier in response to a current or perceived future market need. The filter specifications may include, for example, specifications on the lower and upper frequencies of a pass band and, optionally, one or more stop bands. Filter specifications are commonly described by limitations on the frequency-dependent S-parameters of the filter. For example, the set of specifications may include a minimum value of S(2,1) (i.e. a maximum insertion loss) over the pass band and maximum values of S(2,1) (i.e. minimum insertion losses) over each stop band, if defined. The set of specifications may include a maximum value of S(1,1) (i.e. a minimum return loss) over a defined frequency range. The set of specifications for the filter may include other requirements such as a maximum die size, an operating temperature range, an input power level, and other requirements.

At 1720 an architecture for the filter may be defined. Defining the filter architecture may include selecting a resonator technology (SAW, BAW, etc.). Assuming that SAW technology is selected, defining the filter architecture may also include selecting a substrate configuration (single-crystal or composite) and a particular piezoelectric material and crystalline orientation (i.e. the angle of the surface of a substrate to the internal crystalline axis). Defining the filter architecture may further include selecting a filter topology (ladder, coupled resonator, dual mode SAW, etc.) and the number, type, and arrangement of SAW resonators. Other characteristics of the filter that may be defined at 1720 include the type and thickness of the metal used to form the interdigitated transducers of the SAW resonators, the presence or absence and material of a dielectric coating over the interdigitated transducers, a particular package, and other material and manufacturing-related characteristics.

At 1730, the filter architecture selected at 1720 is converted into an initial or baseline filter design. The initial filter design assigns characteristics, such as resonant and anti-resonance frequencies and physical area to the resonators defined in the filter architecture. The initial filter design may be established, for example, by a design engineer, who may be assisted by a commercial, open-source, or proprietary design synthesis software tool. The initial filter design may be based on the specifications from 1710, the architecture from 1720, and experience with previous filter designs. For example, the initial filter design may be adapted or scaled from a previous design having similar requirements.

Alternatively, the baseline filter design may be generated at 1730 automatically by the design synthesis software tool based on the specifications from 1710. In this case, the design synthesis tool may also perform portions of defining the filter architecture at 1720 (such as selecting the number of resonators). In all cases, the initial filter design may be represented as an electronic circuit composed of interconnected circuit components, with the SAW resonators represented by equivalent circuit models consisting of combinations of lumped resistive and reactive (i.e. capacitor and inductor) circuit components.

The initial filter design from 1730 is analyzed at 1740 using the spectral analysis methods previously described and shown in FIGS. 2, and 9-11. The results of the analysis at 1740 may be an s-parameter matrix or set of frequency dependent s-parameters. At 1750, the analysis results are compared to the specifications from 1710 to determine whether or not the filter design meets the specifications. When a determination is made that the filter design meets the specifications ("yes" at 1750), the final filter design is transformed into a suitable design description file that serves as an input to a manufacturing process. For example, the design description file can include data for creating photomasks for use in manufacturing the SAW filter circuit. The process 1700 then ends at 1795.

When a determination is made that the filter design does not meet the specifications ("no" at 1750), the filter design may be modified at 1760 and the modified design may be analyzed at 1740. The actions from 1740 to 1750 may be repeated cyclically until a determination is made at 1750 that the filter design meets the specifications. During each cycle, the modifications to the filter design at 1760 may be made by the design engineer. Alternatively, the actions at 1740, 1750, and 1760 may be incorporated into a circuit design automation tool that automatically optimizes the performance of the filter design.

In some circumstances (such as after completing a predetermined number of cycles through the actions from 1740 to 1760), a determination may be made that the current filter architecture is incapable of meeting the specifications. In this situation, the process 1700 may return to 1720 (as indicated by the dashed arrow 1765) to select a different filter architecture. Since each SAW resonator occupies a finite substrate area, a filter with fewer resonators will, in general, use a smaller substrate and cost less to manufacture than a filter with more resonators. Thus a possible sequence of actions may be to initially select, at 1720, a filter architecture with marginally few resonators, and then add one or more resonators to the architecture each time the process 1700 returns to 1720. Other changes that may be made when the process 1700 returns to 1720 include different materials or substrate orientation, different packaging, different filter topology, and/or different resonator technology.

The entire process 1700 may be repeated as necessary until a baseline design meeting the specifications is established.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method, comprising:
   receiving, by a computing system, an initial microwave filter design and a set of specifications, the microwave filter design including a plurality of resonators, each resonator represented by a respective equivalent circuit model comprising resistive and reactive circuit components;
   iteratively modifying the microwave filter design, by the computing system, until a circuit scattering matrix of the microwave filter design over a predetermined frequency range corresponds to the set of specifications; and
   generating, by the computing system, a filter design description file for input to a manufacturing process.

2. The method of claim 1, wherein the circuit scattering matrix is generated from a circuit exterior node admittance matrix of the microwave filter design over the predetermined frequency range.

3. The method of claim 2, wherein the circuit exterior node admittance matrix is generated via a Green's Function from a circuit admittance matrix for exterior nodes and algebraic nodes of the microwave filter design.

4. The method of claim 3, further comprising:
   calculating a part admittance matrix with algebraic nodes for each circuit component; and
   calculating the circuit admittance matrix based on the part admittance matrices.

5. The method of claim 4, wherein calculating the circuit admittance matrix further comprises reducing interior nodes of the circuit admittance matrix.

6. The method of claim 3, further comprising reducing the algebraic nodes of the circuit admittance matrix.

7. The method of claim 6, further comprising:
   calculating a time evolution of exterior node to algebraic node admittance using an exponential of a Hurwitz matrix; and
   filtering diagonalization of the time evolution to generate the circuit exterior node admittance matrix.

8. The method of claim 3, further comprising evaluating the Green's Function by linear algebra one frequency at a time over the predetermined frequency range to determine the circuit exterior node admittance matrix.

9. The method of claim 1, wherein each resonator of the plurality of resonators is a surface acoustic wave resonator, a bulk acoustic wave resonator, a film bulk acoustic wave resonator, a thin-film bulk acoustic wave resonator, or a micro-electro-mechanical system resonator.

10. The method of claim 1, wherein each resonator of the plurality of resonators is a surface acoustic wave resonator.

11. A system, comprising:
    a computing system comprising at least one processor configured to:
    receive an initial microwave filter design and a set of specifications, the microwave filter design including a plurality of resonators, each resonator represented by a respective equivalent circuit model comprising resistive and reactive circuit components,
    iteratively modify the microwave filter design until a circuit scattering matrix of the microwave filter design over a predetermined frequency range corresponds to the set of specifications; and
    generate a filter design description file for input to a manufacturing process.

12. The system of claim 11, wherein the circuit scattering matrix is generated from a circuit exterior node admittance matrix of the microwave filter design over the predetermined frequency range.

13. The system of claim 12, wherein the circuit exterior node admittance matrix is generated via a Green's Function from a circuit admittance matrix for exterior nodes and algebraic nodes of the microwave filter design.

14. The system of claim 13, wherein the processor is further configured to:

calculate a part admittance matrix with algebraic nodes for each circuit component; and calculate the circuit admittance matrix based on the part admittance matrices.

15. The system of claim 14, wherein the processor is further configured to reduce interior nodes of the circuit admittance matrix.

16. The system of claim 13, wherein the processor is further configured to reduce the algebraic nodes of the circuit admittance matrix.

17. The system of claim 16, wherein the processor is further configured to:

calculate a time evolution of exterior node to algebraic node admittance using an exponential of a Hurwitz matrix; and filter diagonalization of the time evolution to generate the circuit exterior node admittance matrix.

18. The system of claim 13, wherein the processor is further configured to evaluate the Green's Function by linear algebra one frequency at a time over the predetermined frequency range to determine the circuit exterior node admittance matrix.

19. The system of claim 11, wherein each resonator of the plurality of resonators is a surface acoustic wave resonator, a bulk acoustic wave resonator, a film bulk acoustic wave resonator, a thin-film bulk acoustic wave resonator, or a micro-electro-mechanical system resonator.

20. The system of claim 11, wherein each resonator of the plurality of resonators is a surface acoustic wave resonator.

* * * * *